United States Patent [19]

Lund et al.

[11] E Re. 28,735

[45] Reissued Mar. 16, 1976

[54] CYCLICLY-OPERABLE MACHINE ADAPTED TO PRODUCE AND ASSEMBLE COPE AND DRAG MOLD PARTS

[75] Inventors: Robert S. Lund, Elmhurst; Vernon J. Koss, Niles, both of Ill.

[73] Assignee: Pettibone Corporation, Chicago, Ill.

[22] Filed: May 8, 1975

[21] Appl. No.: 575,659

Related U.S. Patent Documents

Reissue of:

[64] Patent No.: 3,828,840
Issued: Aug. 13, 1974
Appl. No.: 233,438
Filed: Mar. 10, 1972

[52] U.S. Cl. ..... 164/195; 164/200; 164/207; 164/226

[51] Int. Cl.[2] ..... B22C 15/28

[58] Field of Search ..... 164/37, 38, 137, 195, 200, 164/226, 339, 340, 207

[56] References Cited

UNITED STATES PATENTS

| | | | |
|---|---|---|---|
| 3,181,207 | 5/1965 | Schaible et al. | 164/195 X |
| 3,229,336 | 1/1966 | Hunter et al. | 164/195 |
| 3,508,598 | 4/1970 | York | 164/137 X |
| 3,556,196 | 1/1971 | Buhler | 164/38 |
| 3,589,431 | 6/1971 | Fellows | 164/37 X |
| 3,630,268 | 12/1971 | Hatch | 164/226 X |
| 3,760,866 | 9/1973 | Larkin | 164/200 |

*Primary Examiner*—Ronald J. Shore
*Attorney, Agent, or Firm*—Norman H. Gerlach

[57] ABSTRACT

A cyclicly-operable molding machine for producing and assembling cope and drag mold parts. A rotary turntable which supports four pairs of flask sections is repeatedly indexed to move the pairs repeatedly and successively in a circular path through four stations, namely, (1) a working station where the flask sections are variously and automatically handled and in cooperation with a pattern-carrying match plate are filled and compacted with foundry sand so as to produce the two mold parts, (2) a core-setting station where, if required or desired, a core may be applied to one of the formed mold parts, (3) a stripping station wherein the flask sections are again variously handled to strip the sections from the mold parts and the latter are assembled and then deposited on a bottom board which is ejected from the machine, and (4) an idle or dwell station where an empty pair of flask sections awaits handling of a preceding pair of flask sections at the working station before being returned to such station for refilling thereof at the commencement of the next machine cycle.

18 Claims, 38 Drawing Figures

FIG. 9a
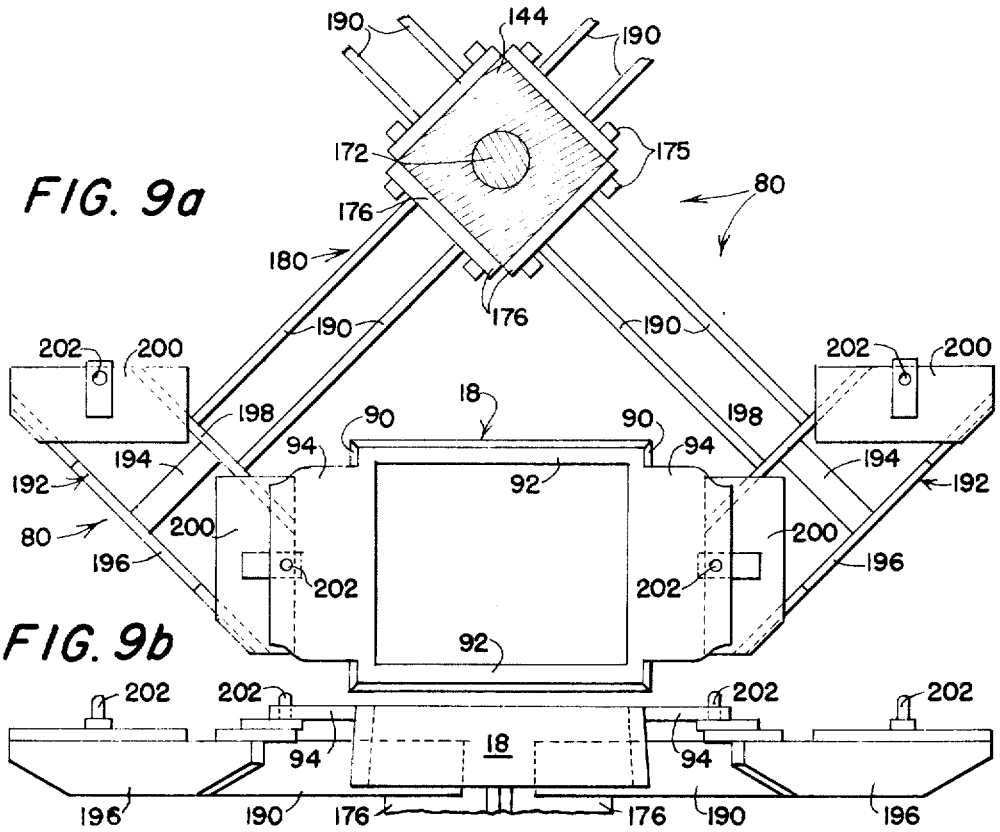
FIG. 9b
FIG. 9c
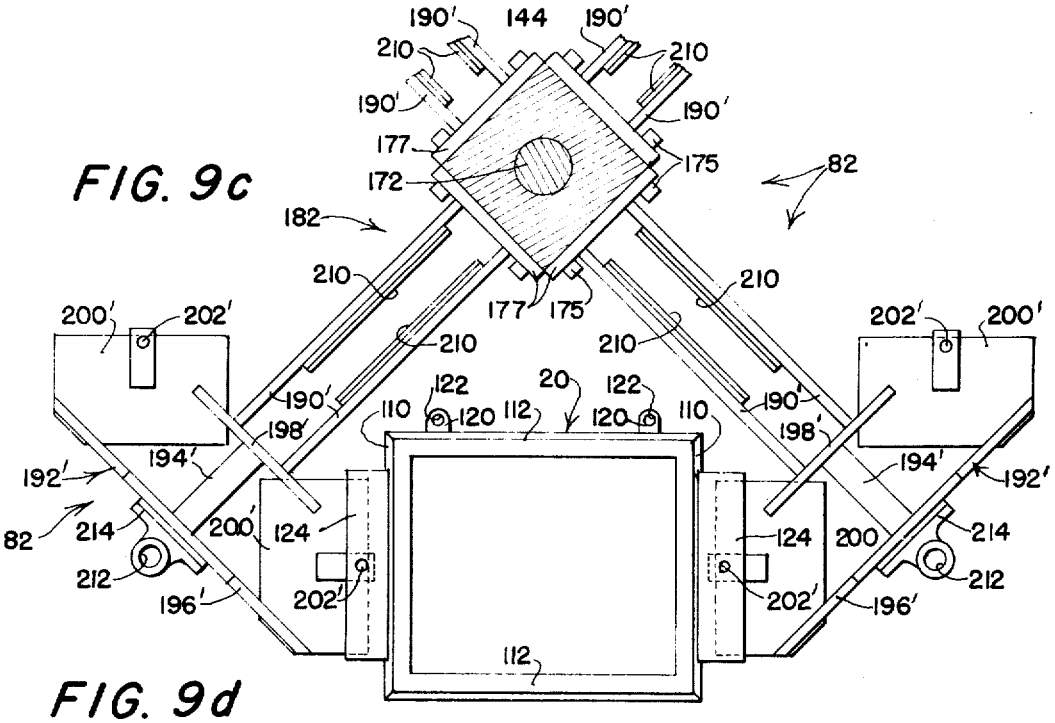
FIG. 9d
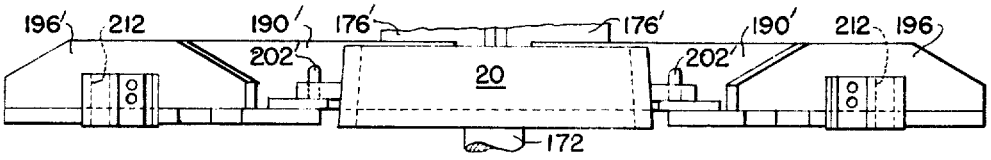

FIG. 30
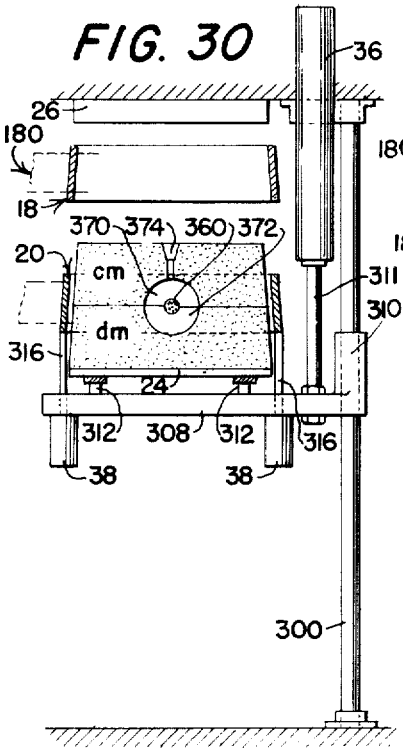
FIG. 31
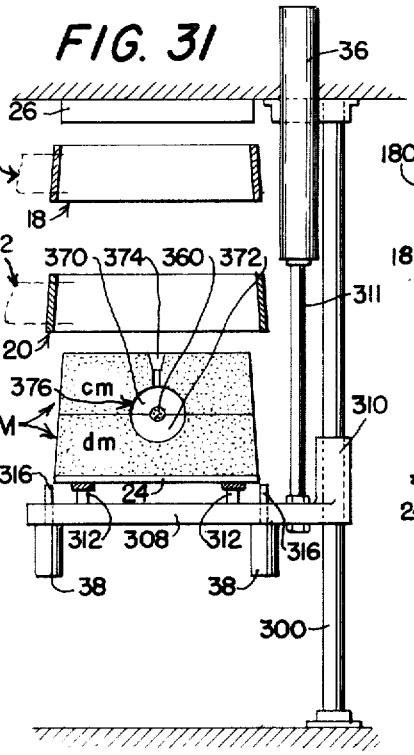
FIG. 32
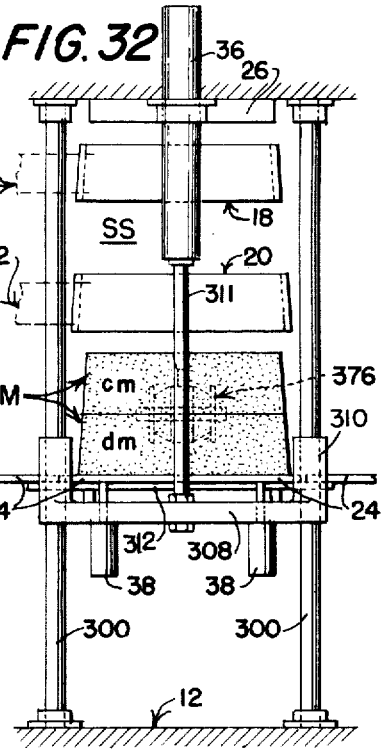
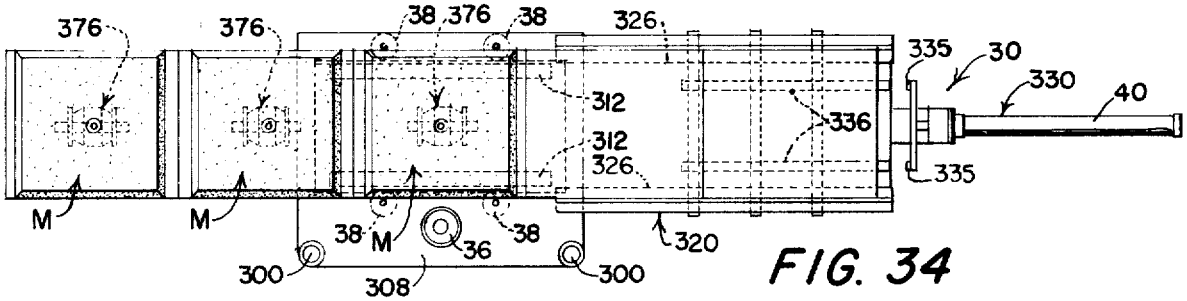
FIG. 34
FIG. 33
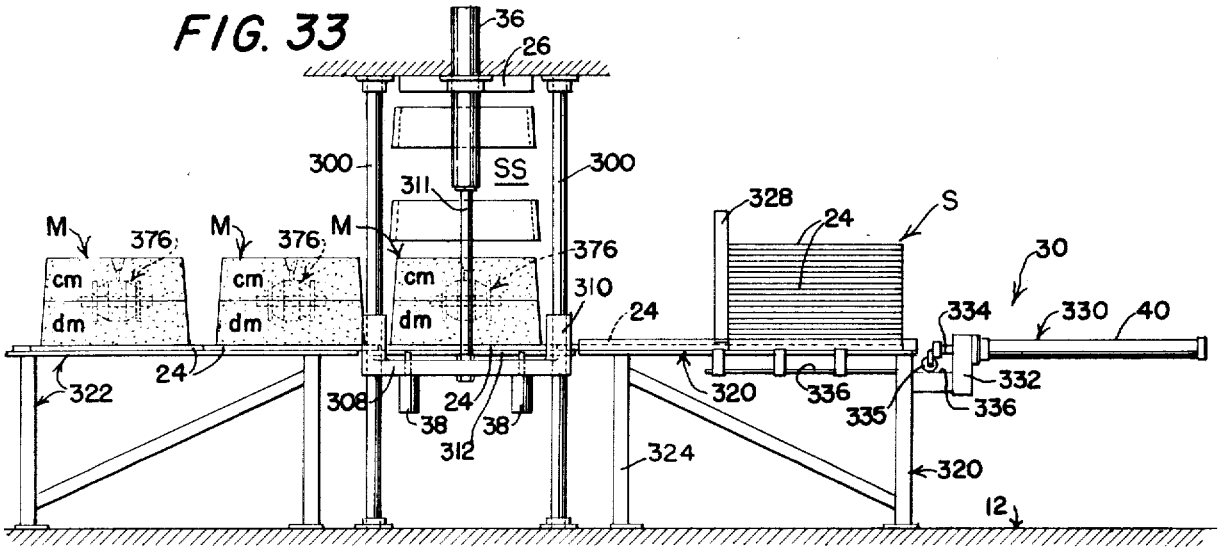

CYCLICLY-OPERABLE MACHINE ADAPTED TO PRODUCE AND ASSEMBLE COPE AND DRAG MOLD PARTS

Matter enclosed in heavy brackets [ ] appears in the original patent but forms no part of this reissue specification; matter printed in italics indicates the additions made by reissue.

The present invention relates generally to machines for producing sand molds for foundry use and has particular reference to a foundry machine which is capable of simultaneously producing the cope and drag parts of a composite sand mold, the two parts being complete and assembled upon each other and ready for a molten metalpouring operation at the time they leave the machine.

Heretofore, in connection with a foundry machine which resorts to the simultaneous blowing of the cope and drag parts of a composite sand mold by the utilization of a dual-sided, horizontally positioned, pattern-carrying, match plate, it has invariably been the practice to perform all machine functions at a single working station where various flask and match plate movements take place with vertical in-line motions under the control of a ram, such movements including, first, bringing a pair of cope and drag flask sections into clamping engagement with the match plate in order to define above and below the match plate cope and drag sand-receiving cavities which are then filled with sand by a simultaneous combined blow and compacting operation, second, performing a squeeze operation by means of which the sand in both cavities is simultaneously and additionally compressed or compacted about the match plate so as to produce the cope and drag parts of the composite mold, third, separating the flask sections with the mold parts therein in order to permit withdrawal of the match plate to an out-of-the-way position, fourth, closing the two flask sections on each other in order to assemble the mold parts and produce the completed composite mold, fifth, performing a push-out or stripping operation by means of which the assembled composite mold is pushed bodily from the confining flask sections, and last, widely separating the flask sections and then pushing or ejecting the completed and assembled mold bodily from the working station and onto a bottom board. One molding machine of this general type is illustrated and described in U.S. Pat. No. 3,229,336, granted on Jan. 18, 1966 and entitled "MATCH PLATE MOLDING MACHINE FOR THE SIMULTANEOUS PRODUCTION OF COPE AND DRAG MOLD SECTIONS," the disclosure of such patent being devoid of the usual associated mold-ejecting mechanism. Another example of such a molding machine is to be found in U.S. Pat. No. 3,648,759, granted on Mar. 14, 1972 and entitled "MACHINE FOR MAKING SAND MOLDS."

The present invention is designed as an improvement over such single-station match plate molding machines in that it contemplates the provision of a multi-station molding or mold-forming machine in which the aforementioned stripping and mold-ejecting operation is completely divorced from the working station and performed at a separate stripping and ejecting station, while an additional station, namely, a core-setting station, is provided to the end that, if required or desired, a core may be placed between the two mold parts preparatory to performance of the stripping and ejecting operation. The provision of these two additional stations obviously necessitates transfer of the flask sections from the working station where the complemental cope and drag mold parts are initially created within the flask sections, to the core-setting station and from thence to the stripping station. Thus, in order that the flaskhandling instrumentalities at the working station shall not remain idle while awaiting performance of the core-setting and stripping operations successively at the two other stations, the present machine makes provision for the use of plural pairs of cope and drag sand mold flask sections, together with transfer means whereby as soon as a given pair of flask sections has been operated upon at the working station, such sections with the mold parts therein are conducted to the core-setting station and a second pair of empty flask sections is moved into the working station to be handled thereat while core-setting operations are being performed on the first pair of filled flask sections at the core-setting station. Similarly, when the second pair of flask sections has been operated upon at the working station and core-setting operations have been completed at the core-setting station on the first pair of flask sections, both pairs of flask sections are conducted by the transfer means from such stations, the first pair of flask sections moving to the stripping and ejecting station with the core in place and the second pair being conducted or moved to the core-setting station while a third pair of flask sections is brought by the transfer means into the working station. After the three pairs of flask sections have been operated upon at the working station, the core-setting station and the stripping and mold-ejecting station, all three pairs of flask sections are conducted by the transfer means from such stations, the first pair (now empty of contents) being conducted to a fourth idle or dwell station to await subsequent transfer to the working station, the second pair being conducted to the stripping and mold-ejecting station from the core-setting station, and the third pair being conducted from the working station to the core-setting station while a fourth pair of flask sections is moved into the working area from the idle or dwell station where it was previously deposited from a preceding machine cycle. The four pairs of flasks constitute component parts of the present molding or mold-forming machine and, although they are variously handled in an automatic manner at the working station and the stripping and mold-ejecting station, they never leave the confines of the machine.

According to the present invention, a convenient transfer means for conducting the pairs of flask sections from one station to the next is afforded by the use of a rotary turntable on which the pairs of flask sections are peripherally or marginally supported so that, upon rotation of the turntable about its vertical axis, they are caused to travel in a circular path which intersects each of the four aforementioned stations. The turntable is capable of being indexed intermittently so that, during each dwell period, each pair of flasks is disposed at one of the stations for flask-handling or other operations at such one station.

For convenience of machine design and to improve machine performance, although there are only three effective operating stations associated with the machine so that the use of only three pairs of flasks on the turntable at a 120° peripheral spacing would be adequate for the production of successive assembled composite molds by the machine, thus omitting the fourth station, it has been found that by providing four pairs of flask sections and incorporating the idle or dwell station in the machine, better machine performance is attained since the pairs of flask sections are not obliged to enter the various stations at a sharp angle. Additionally, the existence of the idle or dwell station affords an opportunity for the operator to inspect the idle pair of flask sections at such station and clean the same if necessary.

Insofar as the aforementioned additional core setting station is concerned, where a single match plate molding machine is concerned in which all operations are performed in a common working area, the core setting operation presents a difficulty in that the operator mush reach into the working area with his hands extending between the drag flask and cope flask mold sections in order to position the cores correctly. There is thus a definite pinch point which must be guarded against because as soon as the cores have been set and the operator removes his hands, the drag and cope flask sections close upon each other. This requires that the operator must at all times be alert and, lacking such alertness, serious accidents may, and do, take place. Where automatic precautionary measures are provided for effecting delayed mold closing operations until the operator is at a safe distance from the working area, the equipment is not only expensive but also it is not always infallible. According to the present match plate molding machine, since core setting is performed at a separate station remote from the working area, and at a core setting station where the flasks are maintained on a carrier at spaced apart locations where they are incapable of coming together, there is no "pinch point" to create a hazard.

The provision of a match plate molding machine such as has briefly been outlined above, and possessing the stated advantages, constitutes the principal object of the invention.

An additional advantage of the invention resides in the use of a Geneva gear drive mechanism for indexing the turntable intermittently, together with a locating or leader pin which is mounted on the machine framework and is hydraulically and selectively driven into one of a series of pilot holes in the turntable and remains therein during each dwell operation of the Geneva gear drive mechanism in order to align the flask sections on the turntable with the associated flask-handling instrumentalities at the working station and the stripping and mold-ejecting station.

A further and important advantage of the invention resides in the fact that, at the stripping and mold-ejecting station, a bottom board is fed into this station immediately prior to arrival thereat of the sand-filled flask sections from the core-setting station and is handled in such a manner that it functions in the manner of a platen during the actual stripping operation and receives the assembled and stripped composite mold thereon, after which said mold is pushed laterally from the machine with the mold resting thereon, this advantage distinguishing the present machine from the aforementioned earlier patented machines where the pushing device or ejector arm engages the mold itself and pushes it laterally from the machine and onto an awaiting bottom board. By depositing the assembled and stripped mold on the bottom board and pushing the latter from the machine according to the present invention, there is no danger of mold part slippage, one upon the other, due either to acceleration or deceleration of the pushing device.

A wide variety of advantages accrues from the fact that transfer of the pairs of flask sections from station to station takes place in a closed circular path, an obvious advantage residing in the fact that by such an arrangement the various operating stations are closely grouped together, thereby resulting in compact machine design. Heretofore, except for the molding machines which are disclosed in aforementioned U.S. Pat. Nos. 3,229,336 and 3,648,759, match plate molding operation have involved separate sand filling or blowing and compacting operations for the cope and drag flask sections. Furthermore, the flask-filling operations invariably have been accomplished by a sand-pouring operation. With some molding machines, it has been found various to perform certain of the flask-handling operations at separate operating stations, but in most instances, flask transfer from one station to another has been affected in a straight line so that the flask various operating stations cannot be regarded as constituting component parts of a single molding machine. Furthermore, there has been no simultaneous handling of both the cope and drag flask sections at all of the involved stations. Accordingly, the simultaneous treatment of the pairs of complemental cope and drag flask sections at all of the operating stations involved in the present molding machine affords a distinct advantage from the point of view of timesaving. Such timesaving is further enhanced by the recycling of empty pairs of flask sections from the mold-stripping station back to the main working station in an automatic manner.

Numerous other objects and advantages of the invention, not at this time enumerated, will either be pointed out or readily suggest themselves as the nature of the invention is better understood from a consideration of the following detailed description.

The invention consists in the several novel features which are hereinafter set forth and are more particularly defined by the claims at the conclusion hereof.

In the accompanying eight sheets of drawings forming a part of this specification, one illustrative embodiment of the invention is shown.

In these drawings:

FIG. 9a is an enlarged horizontal sectional view taken on the line 9a—9a of FIG. 2 and representing, largely, a plan view of the upper turntable spider, the lower turntable spider and the underlying portions of the machine being omitted in the interests of clarity;

FIG. 9b is a side elevational view of the structure of FIG. 9a;

FIG. 9c is a sectional view taken on the line 9c—9c of FIG. 2 and representing, largely, a plan view of the lower turntable spider with the underlying portions of the machine omitted;

FIG. 9d is a side elevational view of the structure of FIG. 9c;

FIG. 30 is a schematic side elevational view similar to FIG. 29 but illustrating a further downward movement of the lift bracket which restores the cope flask section to its normal turntable-supported position at or within the mold-stripping station of the machine;

FIG. 31 is a schematic side elevational view similar to FIG. 29 but illustrating a still further downward movement of the lift bracket which restores the drag flask sections to its normal supported position within the stripping station of the machine and deposits the assembled composite mold on a bottom board;

FIG. 32 is a side elevational view of the structure of FIG. 31;

FIG. 33 is a side elevational view of a mold-ejecting ıechanism which is employed in connection with the resent invention and is disposed in the vicinity of the ıold-stripping station; and FIG. 34 is a top plan view of the structure of FIG. 33.

BRIEF DESCRIPTION OF THE MACHINE

Figure 1:
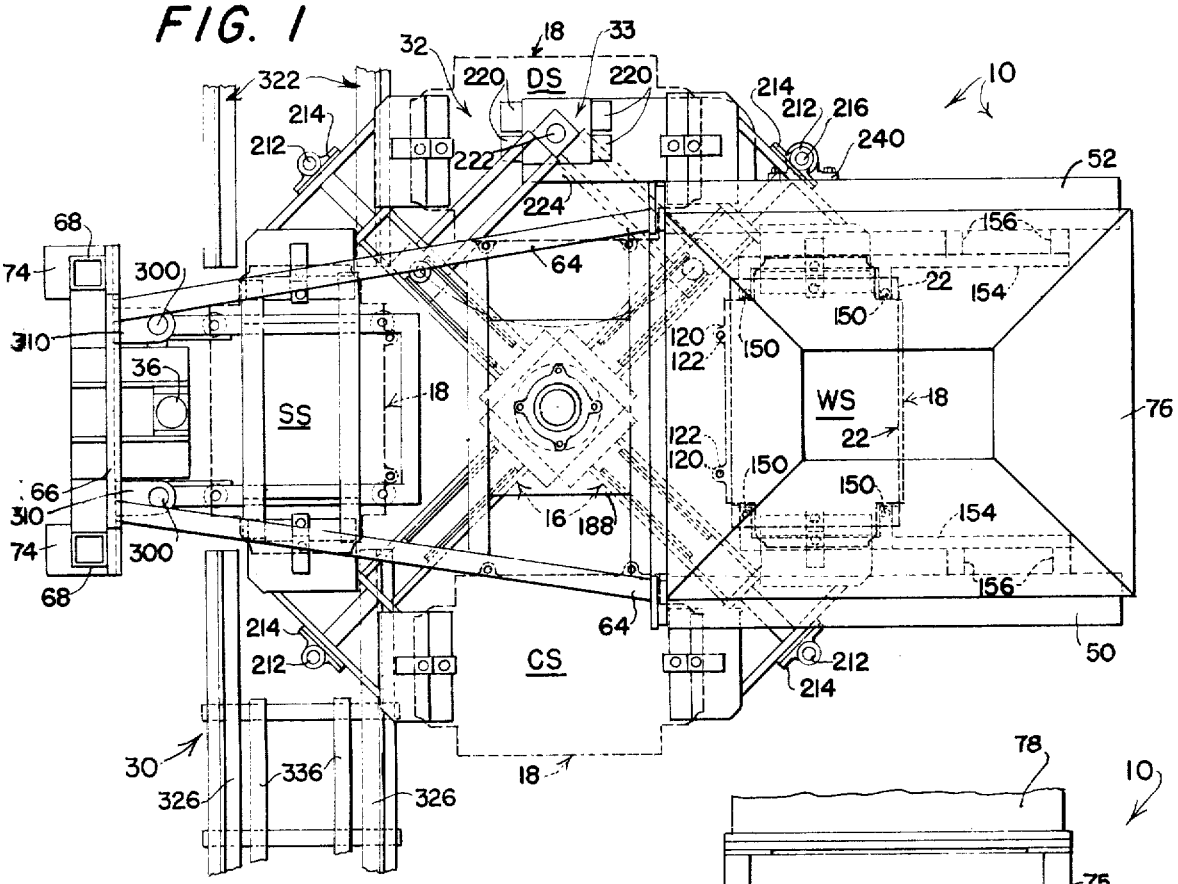
FIG. 1 is a top plan view of a match plate molding or mold-forming machine embodying the principles of the present invention, the machine being devoid of flasks but with flask positioning being illustrated in dotted lines.
Figure 2:
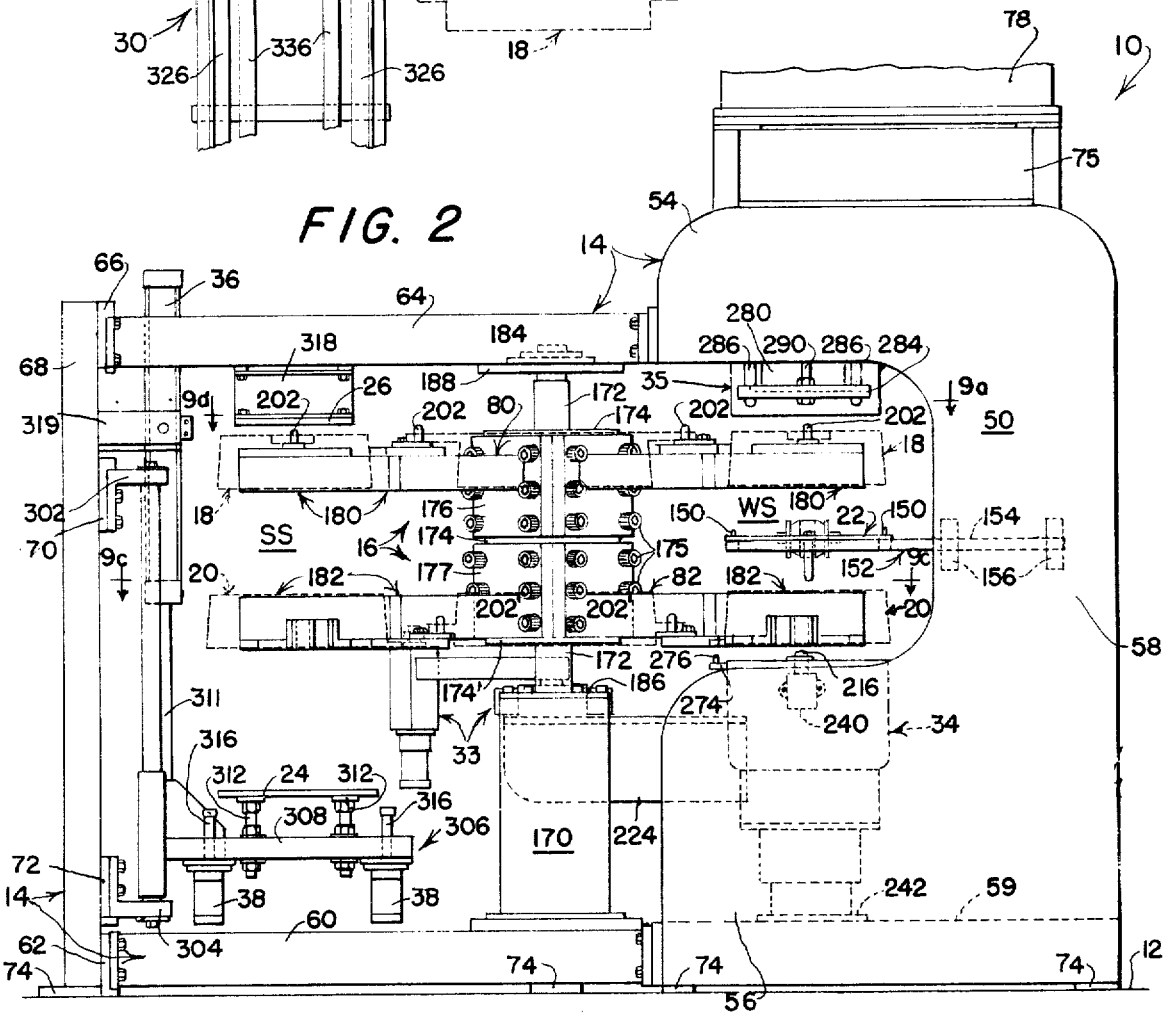
FIG. 2 is a side elevational view of the machine of FIG. 1 with a similar dotted line flask disclosure.

Referring now to the drawings in detail and in particlar to FIGS. 1 and 2, one exemplary form of an autoıatic molding or mold-forming machine embodying ıe principles of the present invention is designated in s entirety by the reference numeral 10. This machine ; shown in the drawings as being positioned upon the .oor 12 or other supporting surface of a foundry or imilar establishment.

Briefly, the mold-forming machine of the present ıvention involves in its general organization a fixed ıachine framework 14 which establishes a series of ɔur quadrilaterally disposed areas or stations in the ɔrm of a main working area or station WS, a core-set-.ng station CS, a mold-stripping station SS, and an idle r dwell station DS. The four stations are disposed 90° part circumferentially about the central vertical axis f an intermittently indexable or movable turntable 16 aving facilities associated therewith for loosely suporting four pairs of flask sections, each pair including n upper or cope flask section 18 and a lower or drag .ask section 20. Such flask sections are illustrated in otted lines in FIGS. 1 to 3, inclusive, in the interests of larity. The turntable 16 is indexable in 90° increments f rotary motion and, upon each indexing operation ıereof, the pairs of flasks at each station are transerred bodily to the next adjacent station in the direcıon of rotation of the turntable, such direction being lockwise as viewed in FIG. 1.

During each turntable indexing operation, a pair of mpty cope and drag flask sections 18 and 20 is transerred from the idle or dwell station DS to the main 'orking station WS where the sections are operated pon by automatic flaskhandling mechanism in a cyclic ıanner to the end that they are first brought into opertive engagement with a pattern-carrying match plate 2 by a clamping operation, the two flask sections are ıen simultaneously filled with prepared molding sand y a blow operation which compacts the sand in a reliminary manner in the mold cavities in the cope nd drag flask sections, the sand in the two flask secons 18 and 20 is then further compacted about the attern on the match plate 22 by a squeeze operation, nd the flask sections are thereafter separated from the ıatch plate 22 by a pattern draw operation in order to elease them for transfer to the core-setting station CS 'ith the compacted sand therein, while leaving the ıatch plate 22 with its associated pattern in its normal osition at the working station WS. These various autoıatic flask-handling operations which are performed pon the cope and drag flask sections 18 and 20 at the 'orking station WS are schematically illustrated in IGS. 12 to 21, inclusive, and will be described in detail ıbsequently when the operation of the machine is set ɔrth.

Figure 23:
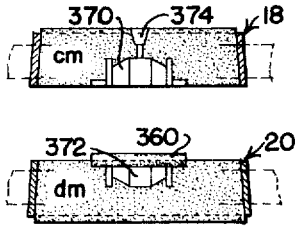
FIG. 23 is a schematic sectional view taken vertically through the core-applying station of the machine, that is, the station to which the sand-filled and compacted cope and drag flask sections that are removed from the working area of the machine are indexed, and showing a core in position on the lower or drag mold part.

At the core-setting station CS, no automatic operaons are performed on the two sand filled and comacted flask sections 18 and 20, these two sections mply remaining in situ on the turntable while a core is ıanually positioned on the compacted sand in the ɔwer drag section 20 as shown in FIG. 23, providing, f course, that such a core is required or desired. If no core is to be used, the core-setting station CS functions in the manner of an idle or dwell station, the filled and compacted cope and drag flask sections 18 and 20 merely awaiting a succeeding or second turntable-indexing operation before transfer thereof bodily to the mold-stripping station SS.

At the mold-stripping station SS, the separated cope and drag flask sections 18 and 20, with the compacted sand therein, are again operated upon by automatic handling apparatus in a cyclic manner whereby a bottom board 24 (see FIGS. 2 and 24 to 33, inclusive) which underlies the two mold sections is caused to move upwardly and, in effect, functions as a lifting platen in order to effect closing of the two flask sections upon each other with consequent mating of the compacted sand mold parts therein to produce the completed composite sand mold which then engages a reaction platen 26 in a gentle manner so that further upward movement of the closed flask sections strips the flask simultaneously from the assembled and board-supported composite sand mold. After this stripping operation, the bottom board, upon lowering thereof, carries the assembled mold downwardly to an ejecting position within the mold-stripping station SS, while at the same time the empty cope and drag flask sections 18 and 20 are restored to their normal positions within such station, awaiting transfer to the idle or dwell station DS during the next indexing operation of the turntable 16.

The automatic flask-handling functions which take place at the stripping station SS are schematically illustrated in FIGS. 24 to 32, inclusive, and they are correlated with cooperating functions which are performed by a bottom board feeding and mold-ejecting mechanism 30, a portion of such mechanism appearing in FIG. 1 and the whole mechanism being disclosed in detail in FIGS. 34 and 35. This mechanism 30 functions in a cyclic manner to feed a single bottom board 24 (see FIG. 2) from a stack S (see FIG. 33) of such bottom boards into operative position at the mold-stripping station SS during the time that the turntable 16 is being indexed for the purpose of bringing a pair of sand-filled and compacted cope and drag flask sections 18 and 20 into the stripping station SS, and also to eject a board-supported completed mold from the stripping station during the next succeeding turntable-indexing operation and conduct the same to a region of discharge.

Figure 4:
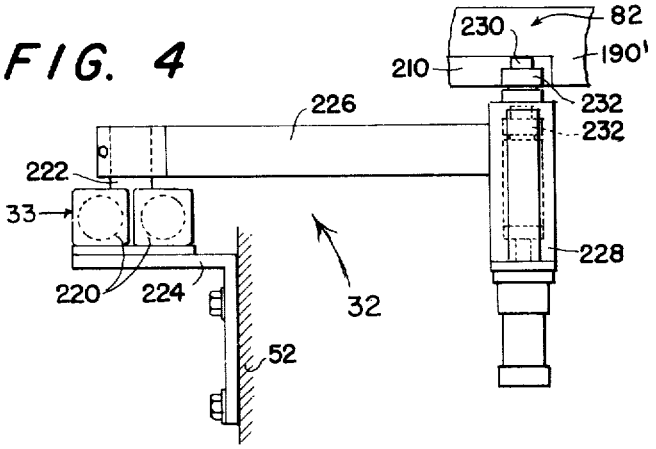
FIG. 4 is a fragmentary side elevational view, somewhat schematic in its representation, of the Geneva drive mechanism which is employed in connection with the molding machine constituting the present invention.
Figure 3:
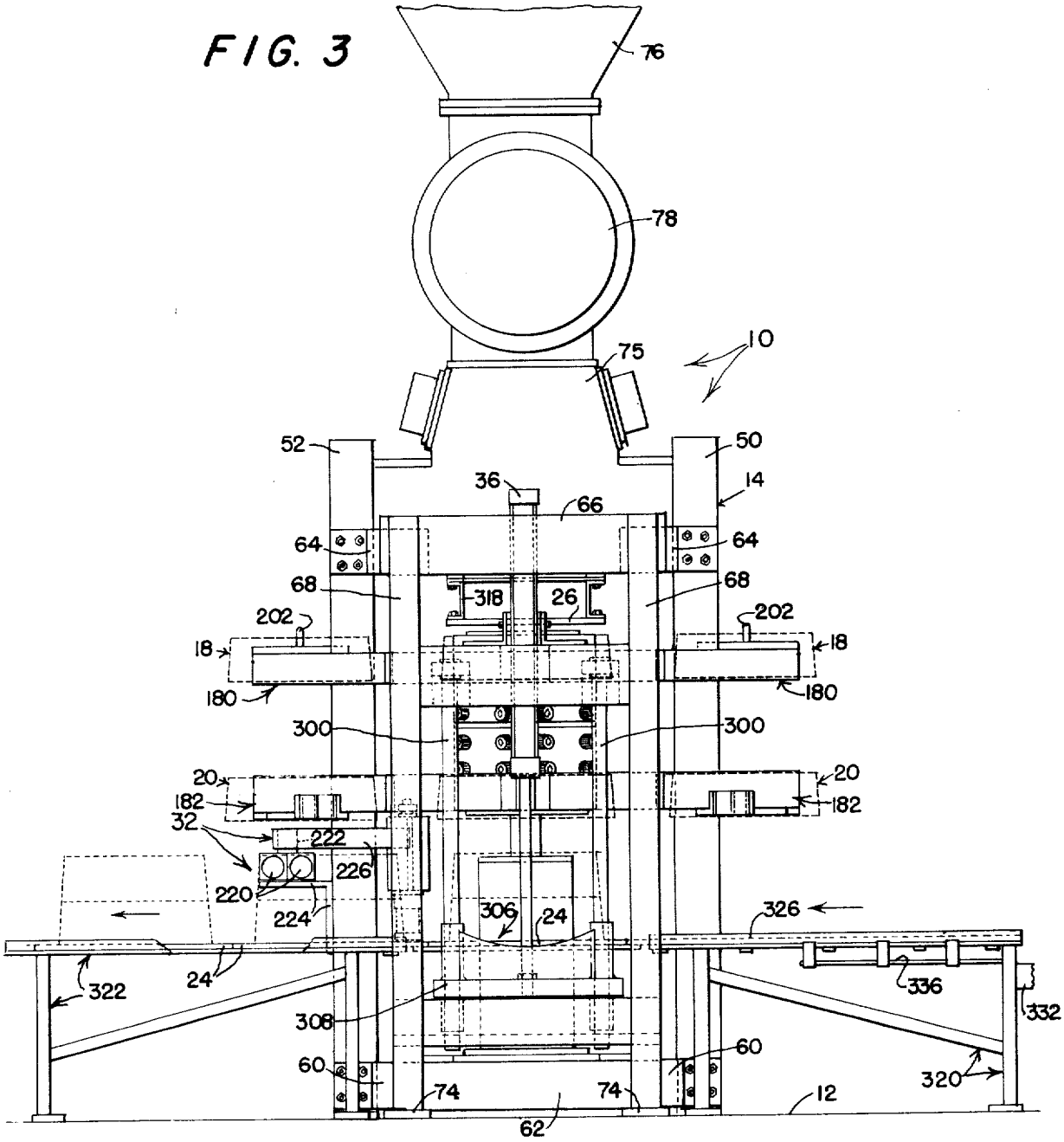
FIG. 3 is an end elevational view of the machine of FIG. 1 with a similar dotted line flask disclosure.

The successive indexing operations of the turntable which take place four times during each machine cycle are effected under the control of an hydraulically-powered Geneva mechanism which is designated in its entirety by the reference numeral 32 in FIGS. 1, 3 and 4 and is driven by a conventional hydraulic Geneva actuator 33.

The flask-handling operations which take place at the main working station WS are effected under the control of an hydraulically-operable ram assembly 34 which cooperates with an upper platen assembly 35 (see FIGS. 2 and 12 to 22, inclusive). The flask-handling operations which take place at the stripping station SS are effected under the control of an hydraulically-operable primary cylinder 36 (see FIGS. 1, 2 and 24 to 33, inclusive), as well as a set of four secondary cylinders 38 which likewise are hydraulically operated. The board-impelling operations which take place at the mold-stripping station SS are performed under the control of an hydraulically-operable ejecting cylinder 40 (see FIGS. 33 and 34).

The hydraulic circuitry and the associated electrical control circuitry by means of which there is effected automatic actuation of the various operating or actuating cylinders which perform flask-handling operations at the working station WS and the stripping station SS, the Geneva actuator 33 which drives the Geneva mechanism for turntableindexing purposes, and the ejecting cylinder 40 which pushes the mold-carrying bottom boards 24 from the stripping station SS, have not been disclosed or illustrated herein since a wide variety of them is capable of performing the necessary control functions. It is deemed sufficient for purposes of discussion or disclosure herein to point out the sequence of operations which is involved during the operation of the machine, as well as particular moments in the machine cycle at which such cylinders and other hydraulic mechanisms are supplied with motive fluid.

THE MACHINE FRAMEWORK

The machine framework 14 appears only in FIGS. 1 to 3, inclusive, and has been omitted from the remaining views in the interests of clarity except for small fragments of the framework such as various vertical supporting standards or posts, stationary flask "rests" or supports and platensupporting brackets, etc. which are disposed in the working station WS and the mold-stripping station SS for storage of the cope and drag flask sections 18 and 20 while they are not actually being handled by the aforementioned flask-handling mechanisms. This machine framework 14 involves in its general organization a pair of relatively massive, laterally spaced, side supports 50 and 52 which are in the form of flat but thick castings of generally C-shape configuration, thus providing upper relatively narrow horizontal legs 54, lower relatively wide horizontal legs 56, and vertical connecting bight portions 58. Side bars 59 extend along the lower edge regions of the lower legs 56 of the side supports 50 and 52.

Extending forwardly from the lower legs 56 of the two side supports is a horizontal bottom frame including forwardly converging side bars 60 and a lower front end bar 62 between the front ends of the side bars. Similarly, extending forwardly from the upper legs 54 of the side supports 50 and 52 is a horizontal top frame including forwardly converging side bars 64 and a top front end bar 66 between the front ends of the last-mentioned side bars. The horizontal top frame directly overlies the horizontal bottom frame. The opposite ends of the lower front end bar 62 overhang the front ends of the forwardly converging side bars 60, and these overhanging portions have fixedly secured thereto vertical corner posts 68, the upper ends of which are fixedly secured to similarly overhanging end portions of the top front end bar 66 of the aforementioned top frame. Upper and lower intermediate transverse bars 70 and 72 extend horizontally between and are suitably secured to the two corner posts 68. The posts 68, as well as the two relatively massive side supports 50 and 52, are mounted on steel floor pads 74.

Mounted on the two side supports 50 and 52 in the upper regions thereof is a sand magazine 75 which is supplied with processed foundry sand from a hopper 76 through the medium of a conventional shut-off gate mechanism 78. The function of the magazine, the hopper, and the gate mechanism will be set forth subsequently when the operation of the machine 10 is described in detail.

THE FLASK SECTIONS

As previously stated, the functioning of the present match plate molding or mold-forming machine 10 is predicated upon the provision of four sets or pairs of flask sections, each pair including the aforementioned upper or cope flask section 18 and the lower or drag flask section 20. These paired sections travel in a circular path of movement under the control of the indexing movements of the turntable 16. Normally, at the commencement of any given machine cycle of operation, the flask sections of each pair are disposed at a position of rest at one of the four stations WS, CS, SS and DS and in vertically separated or spaced relationship with the cope flask section 18 overlying the drag flask section 20. At such time as the turntable 16 is actuated for indexing purposes, the thus paired flask sections at each station are transferred in an arcuate path of 90° extent to the next adjacent or following station with the four pairs of flask sections moving in a clockwise direction as viewed in FIG. 1 and as previously indicated. As will be set forth in greater detail presently, these transfer operations are made possible by the provision of an upper turntable spider 80 for supporting the four cope flask sections 18 and a lower turntable spider 82 for supporting the four drag flask sections 20. These spiders 80 and 82 constitute fixed components of the rotary turntable 16. The upper turntable spider 80 serves normally to support the four cone flask sections 18 in quadrilaterally and circumferentially spaced relationship, while the lower turntable spider 82 similarly serves normally to support the four drag flask sections 20 beneath and in vertical register with the associated cope flask sections. The specific nature of these two spiders 80 and 82 will be described subsequently when the character of the turntable 16 as a whole is described and it is deemed sufficient at present for a proper understanding of the nature of the two flask sections to state that the upper spider 80 embodies four radially extending spider arms having provision at their outer ends for supporting the associated cope flask sections 18, and the lower spider 82 embodies four similar radially extending spider arms having provision at their outer or distal ends for supporting the associated drag flask sections 20.

The Upper Cope Flask Sections

Figure 5:
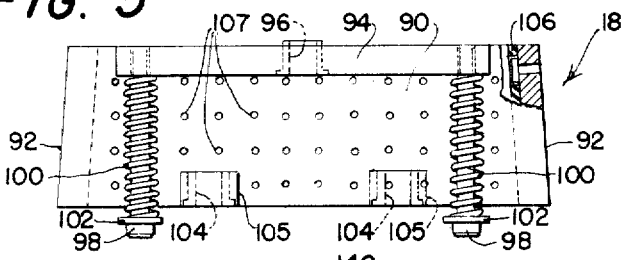
FIG. 5 is an end view of one of a series of cope flask sections which are employed in connection with the invention.
Figure 8:
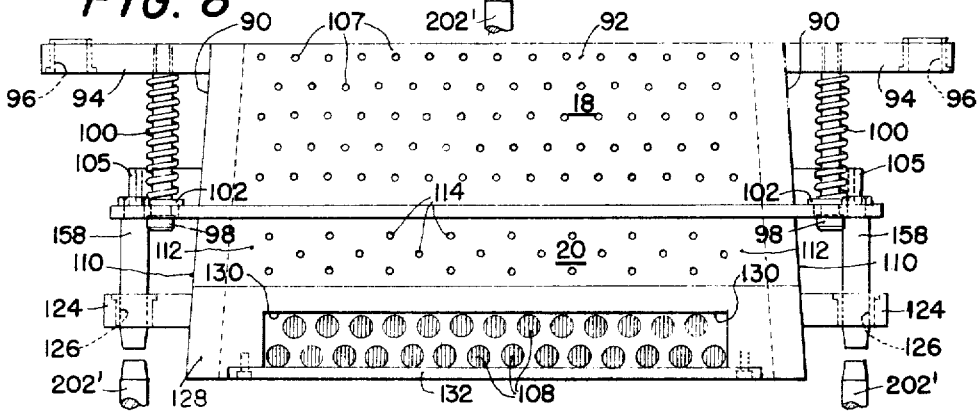
FIG. 8 is a side elevational view of an assembled cope flask section and drag flask section, such sections being previously illustrated in FIGS. 5 and 7, respectively.

Referring now to FIGS. 5 and 8 of the drawings, each of the four upper or cope flask sections 18 is in the form of a cast metal, box-like and generally rectangular structure having opposed end walls 90 and opposed side walls 92. These walls 90 and 92 slope upwardly and inwardly at a small angle so that each wall is of trapezoidal configuration. The upper and lower ends of the upper cope flask sections are open.

In the upper region of each upper cope flask section 18, each end wall 90 is provided with a horizontally elongated, laterally extending, suspension flange 94. The latter is of appreciable width and in the medial region thereof is a bushing-equipped pilot hole 96. The two pilot holes 96 of each cope flask section are designed for cooperation with mating leader pins on the upper turntable spider 80, and these, as will be made clear presently, are for the purpose of insuring proper alignment of the cope flask section with the various actuating instrumentalities at the working station WS of the machine.

At positions near the opposite ends of the laterally extending suspension flanges 94 of each cope flask section 18 are pairs of vertical bolts 98 which extend downwardly below the level of the bottom rim of the flask section and are encompassed by helical compression springs 100. The upper ends of such springs abut against the end regions of the suspension flanges 94 and the lower ends of the springs are captured by washers 102 which bear against boltheads at the lower ends of the bolts. These compression springs function in a manner that will be set forth more in detail subsequently to separate the match plate 22 from the cope flask section 18 during the aforementioned pattern draw operation at the working station WS.

Each cope flask section 18 is further provided with a pair of additional bushing-equipped locating or pilot holes 104 and these are provided in lateral ears 105, one such ear being provided on one end wall 90 near the lower edge thereof and the other ear being similarly provided on the other end wall 90 but in offset relationship so that one of these ears appears in full lines in FIG. 5 while the other ear appears in dotted lines. The two bushing-equipped pilot holes 104 cooperate with upstanding leader pins on the associated drag flask section 20 as will become apparent when the nature of such flask section is set forth presently.

Figure 11:
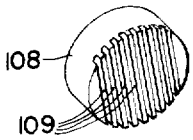
FIG. 11 is a perspective view of the vent or filter screen unit of FIG. 10.
Figure 10:
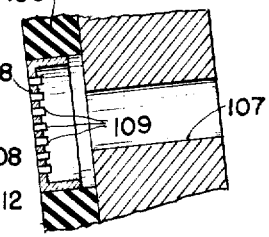
FIG. 10 is an enlarged detail sectional view taken substantially centrally and longitudinally through one of the numerous vents or filter screen units which are employed in connection with cope and drag flask sections of the machine.

The four walls 90 and 92 of each cope flask section 18 are lined with inner facings 106 (see FIGS. 5 and 10) of elastomeric or other wear-resistant material, such walls being, therefore, of dual thickness. These walls are provided with a multiplicity of perforations 107 and each perforation has mounted therein a small cup-shaped sand screen unit 108 (see FIGS. 10 and 11), the bottom wall of which is formed with a series of narrow parallel slits 109. The latter are of such small width that, during the blow operation of the machine, air may escape through the walls of the cope flask sections while the blown and compacted sand remains confined within the interior of such sections. This blow operation is performed through the open upper rim of each cope flask section 18.

The Lower Drag Flask Sections

Figure 7:
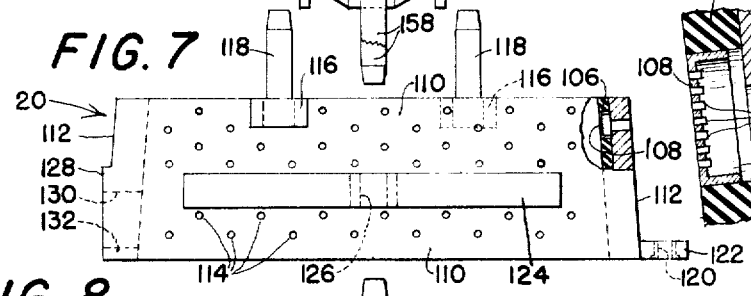
FIG. 7 is an end view of one of a series of drag flask sections which are employed in connection with the invention.

Referring now to FIGS. 7 and 8 of the drawings, each lower drag flask section 20 is in the form of a cast metal, rectangular, box-like structure having upper and lower open rims and including a pair of opposed end walls 110 and a pair of opposed side walls 112. Such end and side walls slope upwardly and inwardly to the end that each drag flask section 20 assumes the same general tapered appearance as its previously described and associated cope flask section 18. The size of the rectangular open upper rim of each drag flask section is identical to the size of the rectangular open lower rim of the associated superjacent cope flask section 18 so that these two rims will mate with each other during the flask-clamping operation which will be described hereafter. The four walls 110 and 112 of each drag flask section 20 are provided with perforations 114 which are similar to the perforations 107 in the walls 90 and 92 of the cope flask sections 18. Each perforation 114 has associated therewith one of the screen units 108.

Figure 9:
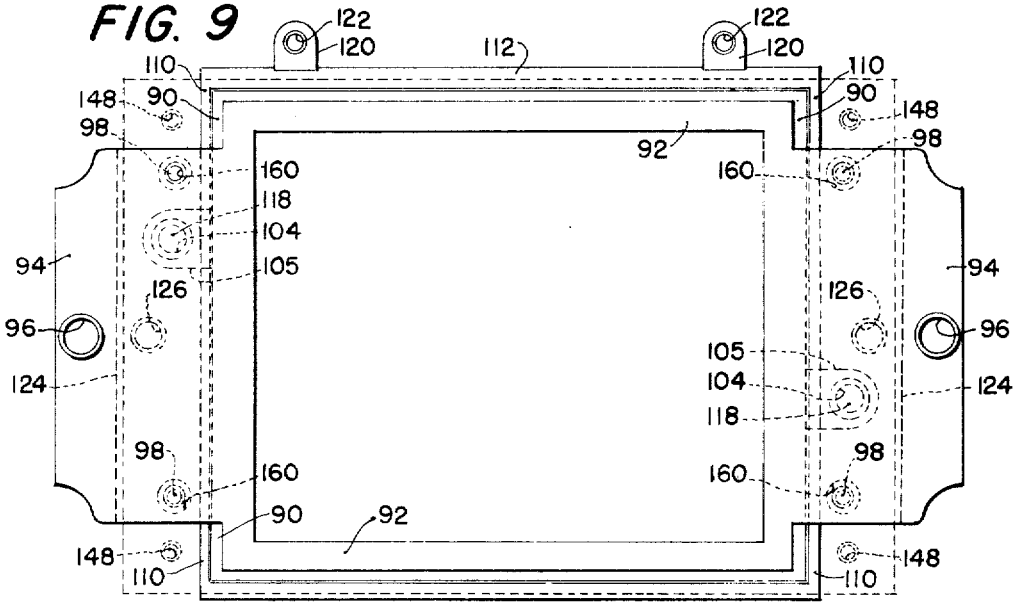
FIG. 9 is a top plan view of the structure which is shown in FIG. 8.

The end walls 110 of each drag flask section 20 are provided with two lateral ears 116, there being one such ear on each end wall. These ears are laterally offset from each other and have fixedly mounted thereon upstanding leader pins 118 which are adapted to register vertically within the aforementioned pilot holes 104 in the lateral ear 105 on the lower edge portions of the end walls 90 of the cope flask section 18. Additional ears 120 on one of the side walls 112 of each drag flask section 20 are provided with bushing-equipped holes 122 (see FIG. 9) which are designed for cooperation with upstanding pilot pins on the ram 34 in a manner that will be made clear when the operation of the machine 10 is set forth.

Lateral flanges 124 on the end walls 110 of each drag flask section 20 are provided with bushing-equipped holes 126, the latter being designed for cooperation with depending leader pins on the match plate 22 in order properly to align the match plate and the subjacent drag flask section during the blow operation as will likewise be set forth subsequently. The holes 126 are dual-purpose holes and, in addition to being capable of mating engagement with depending leader pins on the match plate 22, they are also capable of cooperation with upstanding leader pins which are provided on the turntable and determine the normal position of the drag flask section while it is supported on the turntable.

As best shown in FIG. 8, one of the end walls 100 of each drag flask section 20 is formed with an outwardly offset or displaced area 128 in which there is formed a horizontally elongated rectangular blow opening 130 through which aerated sand is blown during the blow operation when both flask sections 18 and 20 are simultaneously charged with sand. The "shaded" circles which appear within the confines of this blow opening 126 represent an inside view of the various sand screen units 108 which are disposed in the far side wall 112 of the illustrated drag flask section. An elongated thin bridge strip 132 defines the lower boundary of the blow opening 130. It is held in position by screws and thus obviates the disadvantage incident to a corresponding thin wall strip in the original casting from which the drag flask section is made.

THE MATCH PLATE AND PATTERN

Figure 6:
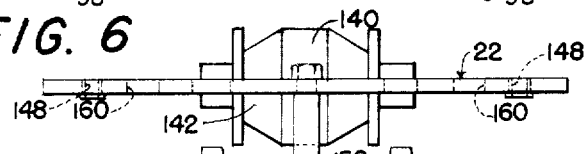
FIG. 6 is an end view of the match plate which is employed in connection with the invention at the working station.
Figure 15:
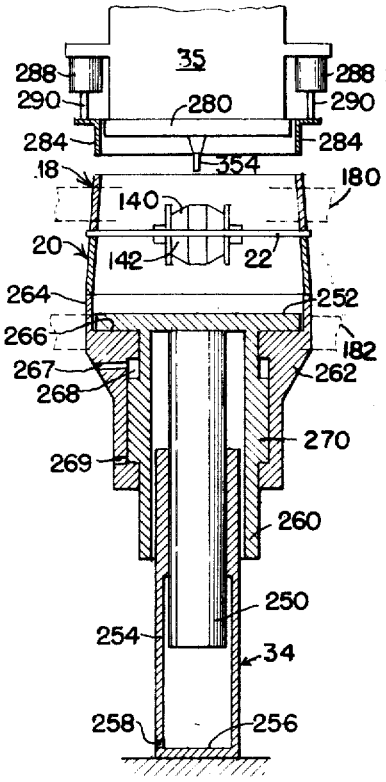
FIG. 15 is a schematic sectional view similar to FIG. 14 but illustrating the drag and cope flask sections in position against the match plate due to a further upward movement of the lift plunger of the ram assembly.
Figure 16:
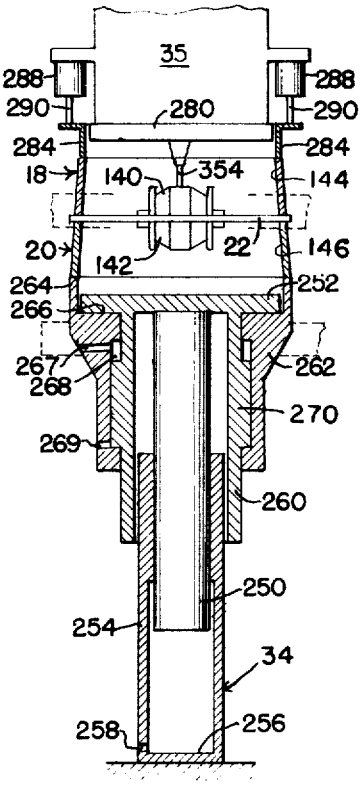
FIG. 16 is a schematic sectional view similar to FIG. 15 but illustrating the drag flask section and the cope flask section, both in their fully clamped positions and immediately prior to the blow operation whereby mold-forming sand is introduced and compacted into both flask sections.
Figure 17:
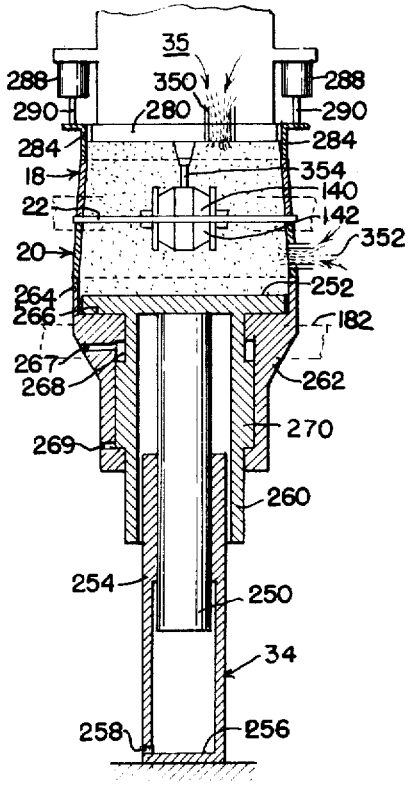
FIG. 17 is a schematic sectional view similar to FIG. 16 but illustrating the blow operation whereby the cope and drag flask sections are filled with sand and simultaneously compacted by blowing.

The match plate 22 is shown in detail in FIG. 6 of the drawings and its functional relationship in the machine is illustrated in FIGS. 12 to 22, inclusive. This match plate is sometimes referred to in he foundry industry as a pattern plate and is in the form of a flat rectangular plate to the upper and lower sides of which there are suitably secured an upper or cope pattern part 140 and a lower or drag pattern part 142. The upper surface of the match plate 22 is designed for contact with the lower open rim of the superjacent box-like cope flask section 18 during the blow and squeeze operations of the machine at the working station WS, while the lower surface of said match plate is similarly designed for contact with the upper open rim of the subjacent box-like drag flask section 20 during such blow and squeeze operations. When this sealing relationship is attained, the side walls 92 and end walls 90 of the superjacent cope flask section 18, in combination with the upper surface of the match plate 22, establish a cope flask cavity 144 (see FIG. 16) which, during the blow operation, becomes filled and compacted with sand as shown in FIG. 17. Additionally, the side walls 112 and end walls 110 of the subjacent drag flask section 20, in combination with the lower surface of the match plate 22, establish a drag flask cavity 146 which likewise is adapted to become filled and compacted with sand during the blow operation.

Four bushing-equipped pilot holes 148 are provided in the four corners of the match plate 22 and are designed for cooperation with four upstanding pilot pins 150 (see FIG. 2). The latter are provided on a fixed match plate supporting bracket 152 (see also FIG. 21) which is mounted on the two side supports 50 and 52 of the machine framework and projects into the working station WS. This bracket 152 includes a pair of rearwardly and horizontally extending parallel arms 154 which are adjacent to the path of travel of the flask sections 18 and 20 as the latter move into the working station WS, and which are maintained spaced from the side supports 50 and 52 by means of inwardly extending supporting bars 156.

Normally, the match plate 22 rests by gravity loosely upon the two parallel arms 154 of the supporting bracket 152. It is, however, adapted to be lifted vertically from said arms by the subjacent drag flask section 20 during flask-handling operations at the working station WS under the control of the ram 34 as will be described in detail presently.

The vertically extending pins 158 are fixedly connected to and depend from the match plate 22 near the side edges thereof and midway between the end edges of the match plate, and they are designed for cooperation with the aforementioned bushing-equipped holes 126 in the ears 124 on the sides of the subjacent cope flask section 20 for match plate and flask alignment purposes as previously set forth.

Still referring to FIG. 6, and additionally to FIG. 8, the match plate 22 is provided with a series of four holes 160 near the corners thereof, these holes being designed to accommodate and cooperate with the lower head-equipped ends of the aforementioned bolts 98 which are carried by the superjacent cope flask section 18 at such time as the lower open rim of such flask section is brought into engagement with the upper side or surface of the match plate during the flask-clamping operation at the working station WS of the machine. The diameter of these holes 160 is such that the heads of the bolts 98 may pass therethrough while the washers 102 which are loosely and slidably mounted on the bolts may not pass through such holes. Therefore, when flask-clamping operations are in progress, the springs 100 which surround the bolts 98 are placed under compression and, thereafter, after the sand-compacting or squeeze operation has been completed and clamping pressure is relieved during the push-out operation, these springs assist in separating the match plate from the bottom side of the cope mold part by overcoming any adhesive bond which may exist between the match plate and the cope mold part or the cope pattern part 140 and said cope mold part.

THE FLASK-SUPPORTING TURNTABLE AND ITS DRIVE MECHANISM

As best shown in FIGS. 1 to 3, inclusive, the turntable 16 is supported for rotation about a vertical axis in the central region of the machine framework from a central supporting pedestal 170 from which there projects upwards a rotatable cylindrical column 172. On such column, there is fixedly secured a tubular turntable hub 174 having a cylindrical inside surface and a square outside surface, the surface presenting four vertical planar side surfaces. Secured to these four planar side surfaces of the hub 174 by way of Allen head-type bolts 175 or the like are an upper series of rectangular hub plates 176 and a lower series of rectangular hub plates 177. Such hub plates, in effect, constitute supporting brackets for a plurality of radially extending spider arms which constitute components of the aforementioned upper and lower turntable spiders 80 and 82. These turntable spiders include a series of four radially extending upper arms 180 and a similar series of four radially extending lower arms 182. The latter spider arms are in vertical register with the former arms, or stated otherwise, the lower spider arms 182 directly underlie and extend parallel to the upper spider arms 185 and are spaced downwardly therefrom as clearly shown in FIG. 2. Upper and lower bearing assemblies 184 and 186 on the machine framework 14 and the pedestal 170, respectively, receive the opposite ends of the column 172 and thus maintain the turntable as a whole in its erect vertical position. The upper bearing assembly 184 is in the form of a ball bearing flange block and is mounted on a plate 188 on the central upper portion of the framework 14 of the machine 10.

The Upper Cope Flask-Supporting Spider

Referring now to FIG. 9a of the drawings, the four radial spider arms 180 of the upper turntable spider 80 are identical and, therefore, a description of one of them will suffice for them all. Each spider arm 180 includes one of the aforementioned rectangular hub plates 176 and from such hub plate there project radially outwards two parallel side bars 190, the inner ends of such side bars being welded to their respective or associated hub plate 176. The outer or distal ends of the two side bars 190 serve to support a generally T-shaped bracket 192 which consists of an intermediate leg 194, a long outer T-head 196, and a short inner T-base 198. Welded or otherwise secured to the opposite ends of the long outer T-head 196 and short inner T-base 198 are two supporting plates 200, each plate having associated therewith an upstanding leader pin 202. Each supporting plate 200 serves normally to support one end of an associated cope flask section 18, such section thus having its opposite ends effectively resting in chordal fashion on the outer ends of a pair of adjacent radially extending upper arms 180 with the main body portion of the flask section being disposed in the general plane of the upper turntable spider 80 between adjacent upper arms 180 as shown in dotted lines at four places in FIG. 1.

The Lower Drag-Supporting Spider

Referring now to FIGS. 1, 2 and 9b of the drawings, the lower turntable spider 82 is similar to the previously described upper turntable spider 80 which overlies it, the lower rectangular hub plates 177 serving to support the radially extending lower arms 182 of said lower turntable spider 82. Said lower arms 182 are similar to the upper spider arms 180 and, therefore, in order to avoid needless repetition of description, similar reference numerals with a prime suffix are applied herein to the component parts of the spider arms 182 which have corresponding counterparts as compared to the upper spider arms 180. Otherwise, it is deemed sufficient for an understanding of the nature of the lower spider arms 182 to point out the differences which exist between these lower spider arms and the upper spider arms 180.

The side bars 190' of the lower spider arms 182 are slightly wider in a vertical direction than the upper spider arms 180 and the supporting plates 200' which are associated therewith and serve to support the drag flask sections 20 are welded along the lower edges of the longer outer T-heads 196' and the short inner T-bases 198' instead of along the upper edges thereof.

his does not change the elevation of the drag flask ections 20 when they are supported by the plates 200' ı view of the fact that the lateral flanges 124 on the nd walls 110 of the cope flask sections 20 are posi- ıoned lower on said end walls than the lateral flanges 4 on the end walls 90 of the cope flask sections 18.

Another difference between the lower spider arms 82 and the upper spider arms 180 resides in the fact ıat the upstanding leader pins 202' on the supporting lates 200' of the lower turntable spider 82 are not in ertical alignment with the upstanding leader pins 202 n the supporting plates 200 of the upper turntable pider 80. The distance between the leader pins 202' n adjacent lower spider arms 182 is less than the dis- ınce between the leader pins 202 on adjacent upper pider arms 180. The reason for this is that the leader ins 202' are designed for cooperation with the bush- ıg-equipped holes 126 which are provided in the lat- ral flanges 124 on the end walls 110 of the drag flask ections 20 and which also cooperate with the down- ıardly projecting or depending pins 158 on the match late 22. Insofar as the leader pins 202' are concerned, ıeir spacing must, therefore, be equal to the spacing of ıe pins 158 on the match plate.

An important difference between the lower turntable pider 82 for supporting the drag flask sections 20 and ıe upper turntable spider 80 for supporting the cope ask sections 18 resides in the provision of pairs of nti-friction wear liners 210 which are disposed in op- osed relationship on the inner sides of the parallel side ars 190' of the lower spider arms 182. These anti-fric- on wear liners define therebetween radially extending uide slots and cooperate in a manner that will be set ɔrth subsequently with the aforementioned Geneva ıechanism 32 for turntableindexing purposes.

Additional components on the lower turntable spider 2 which are not present on the upper spider 80 are a eries of four turntable-stabilizing and locating sockets 12. The latter are formed in four brackets 214 which re fixedly mounted on the outer surfaces of the long uter T-heads of the T-shaped brackets 192' at the istal ends of the lower spider arms 182. These sockets re thus disposed 90° apart on the turntable and are esigned for successive cooperation with a vertically idable, hydraulically-operated shot pin 216 (see IGS. 1 and 2) to stabilize the turntable in between ıdexing operations in a manner that likewise will be ıade clear during a subsequent discussion of the Ge- eva mechanism 32 and the manner in which such ıechanism causes turntable-indexing operations. The ıot pin 216 is spring-biased in such manner that it is rged upwardly.

The Turntable Drive Mechanism

As previously stated, the turntable 16 is adapted to e periodically indexed throughout an angle of 90° nder the control of the Geneva mechanism 32 and its rive motor or actuator 33. This Geneva actuator 33 ıee FIGS. 1 to 4, inclusive) may be of any conven- onal construction, there being several forms of com- ıercially available actuator units which are capable of se in connection with the molding machine 10. One ıch unit is manufactured and sold by HydraPower, ıc. of Wadsworth, Ohio, and is designated as "Model 'o. 150M." Briefly, the Geneva actuator 33 embodies ɔur hydraulic cylinders 220 which are arranged in pposed pairs, each pair controlling the longitudinal ding movement of an internal rack (not shown). A central pinion (likewise not shown) meshes with both racks and carries a vertical oscillatory output shaft 222 which, in the present case, is capable of rotation in opposite directions about an angle of 90°. The Geneva actuator 33 is mounted on a supporting bracket 224 which is secured by bolts 225 (see FIG. 4) to the side support 52 in such positional relationship that the actu- ator 33 underlies the peripheral or circumferential sweep of the arms 182 of the lower turntable spider 82 as clearly shown in FIG. 3 of the drawings. Mounted on the oscillatory output shaft 222 is a Geneva drive arm 226, the distal end of which serves to support an hy- draulic cylinder unit 228 by means of which a spring- biased, vertically extending shot pin 230 with a roller 232 is selectively projected into and withdrawn from the radially extending confining spaces or guide slots which exist between the spaced apart anti-friction wear liners 210 of the lower spider arms 182.

It will be understood, of course, that each 90° turnta- ble indexing operation is effected by causing the Ge- neva drive arm 226 to swing from the full-line position in which it is illustrated in FIG. 1, in a counterclockwise direction as seen in this view through an angle of 90° to the end that the shot pin 230 and its roller 232 (which normally remain in their upwardly projected, spring- biased position) will ride radially inwardly in the associ- ated guide slot which is provided by the adjacent pair of anti-friction wear liners 210, thus causing the turntable 16 to rotate in a clockwise direction by a simple har- monic motion. At the completion of the drive stroke of the drive arm 226 as shown in dotted lines in FIG. 1, the turntable 16 will have been indexed throughout an angle of exactly 90° thus causing it to shift each pair of flask sections 18 and 20 on the turntable 16 from its present station to the next adjacent or following station for flask-handling or other operations at such latter station. At the completion of each turntable-indexing operation, the hydraulic cylinder unit 228 is energized to withdraw the shot pin 230 with its roller 232 from the adajcent radial guide slot between the wear liners 210 and, during such time as the hydraulic cylinder unit 228 remains energized, the hydraulic Geneva actuator 33 is actuated in a reverse direction to restore the drive arm 226 to its full-line normal position as shown in FIG. 1, after which the hydraulic cylinder unit 228 is deener- gized in order to allow the shot pin 230 with its associ- ated roller 232 to be projected into the guide slot which exists between the anti-friction wear liners 210 of the next adjacent lower spider arm 182.

In order to stabilize the turntable 16 in between in- dexing operations of the Geneva mechanism 32, and thus, insure prope: flask section alignment with the flask-handling components at the working station WS, the aforementioned shot pin 216 is projected at the completion of each indexing operation into the socket 212 at the distal end of the adjacent lower spider arm 182 where it remains until the commencement of the next succeeding indexing operation. As best shown in FIG. 2, the aforementioned shot pin 216 is extensible and retractible under the control of a cylinder 240 which is secured to the outer side of the side support 52 of the machine framework 14. Thus, immediately be- fore a given indexing operation takes place, the cylin- der 240 is energized to retract the roller-equipped shot pin 216. This retraction of said shot pin remains effec- tive during the entire indexing movement of the turnta- ble 16, after which the cylinder 240 is deenergized so as to allow the spring-biased shot pin 216 to enter the socket 212 at the distal end of the succeeding lower spider arm 182 which has been brought into vertical alignment with such shot pin.

THE HYDRAULICALLY-OPERABLE RAM ASSEMBLY

The hydraulically-operable ram assembly 34 appears in outline in FIG. 2 and in detail in FIGS. 12 to 22, inclusive. This ram assembly is supported on a platform 242 (see FIG. 2) which extends between the horizontally, spaced apart, side bars 59 of the machine framework 14. Such platform supports the ram assembly so that it is centered within the working station WS with the result that it is properly aligned with the various flask-handling and other instrumentalities at this station.

Figure 12:
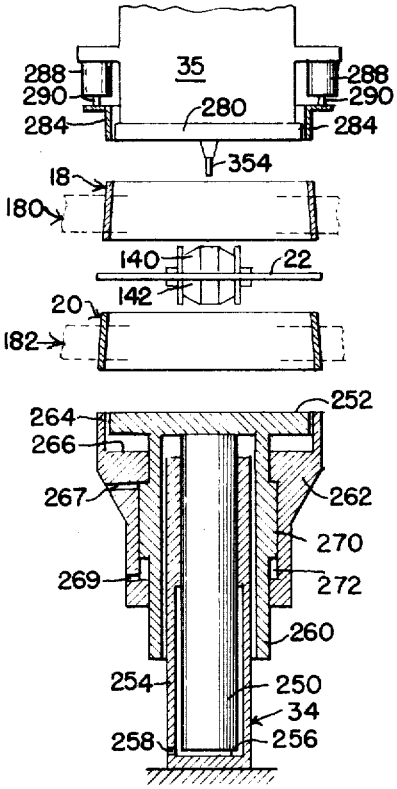
FIG. 12 is a sectional view, largely schematic in its representation, taken vertically and centrally through the working area or station of the machine and illustrating the associated ram assembly, the flask sections and the match plate in their normal positions at the commencement of a machine cycle.

As shown in FIG. 12 and also subsequent views, the ram assembly 34 embodies a vertically extending, central lift plunger 250 on the upper end of which there is fixed, mounted or secured a lower drag section squeeze plate 252. The lift plunger 250 is surrounded by a fixed, vertically extending, cylinder body 254 within which the plunger operates with a vertical sliding action. The upper end of the cylinder body 254 is open and the lower end is provided with a closure wall 256. As shown in FIG. 12, an oil inlet port 258 is formed in the cylinder body 254 in the vicinity of said closure wall 256. The lower drag squeeze plate 252 is formed with a downwardly extending tubular floating plunger 260 which is surrounded by an outer lift sleeve 262. The latter is slidable vertically to a small extent relatively to the floating plunger 260 and is provided with an upper, vertical, continuous rectangular wall 264 and also an inner, horizontal, upwardly facing, ledge-like surface 266 on which the lower drag section squeeze plate 252 normally seats or rests as shown in FIGS. 13 to 17, inclusive. When oil under pressure is supplied to the cylinder body 254 through the port 258, the lift plunger 250 together with the floating plunger 260 and the lift sleeve raises.

The upper rectangular wall 264 constitutes a so-called "drag upset" and is designed for engagement with the lower open rectangular rim of the superjacent drag flask section 20 during flask-closing, sand-squeezing, and other mold-forming operations and, therefore, this wall 264 and the lift sleeve 262 may be regarded as constituting a lower drag flask section extension, and it will sometimes be referred to hereinafter as such. The central lift plunger 250 functions to control the absolute movements of the lower drag section squeeze plate 252 and the intermediate tubular floating plunger 260. The lift sleeve in response to upward movement of the lift plunger 250 effectively engages and moves the superjacent drag flask section 20 during handling of the various pairs of flask sections at the working station WS.

An upper oil port 267 is formed in the upper region of the lift sleeve 262 and leads to the upper end of an annular chamber 268 which exists between said lift sleeve and the tubular floating plunger 260, and a lower oil port 269 is formed in the lower region of the lift sleeve 262 and leads to the lower end of said annular chamber 268. The region of the tubular floating plunger 260 between the two oil ports 267 and 269 is enlarged in order to form a piston 270 which operates in an internal recess 272 in the wall of the lift sleeve 262 as well as in the aforementioned chamber 268. The ports 267 and 269 are adapted to be connected by flexible oil lines (not shown) to a source of oil under pressure with the flow of oil through such lines being regulated by suitable control valves (also not shown). When oil under pressure is admitted into the lower end of the chamber 268 via the lower oil port 269 while the upper oil port 267 is in a vented condition, the lift sleeve 262, together with the rectangular wall 264 (drag upset), moves downwards with respect to the tubular floating plunger 260 and the lift plunger 250, and when oil under pressure is introduced into the upper end of the annular chamber 268 by way of the upper oil port 267 and the lower oil port 269 is in a vented condition, the lift sleeve 262, together with its upper vertical continuous rectangular wall 264, moves upwards with respect to said tubular floating plunger 260 and the lift plunger 250.

The operation of the ram assembly 34, i.e., the specific and relative movements of the central lift plunger 250, the drag flask section control plunger 260 and the lift sleeve 262, which take place during the machine cycle will be described in detail when the operation of the sand mold-forming machine 10 is set forth in detail subsequently. However, for the present, it is deemed sufficient to state that the admission of oil under pressure to the port 258 in the lower end of the stationary cylinder body 254 will serve forcibly to slide the lift plunger 250 upwardly, thus positively forcing upwards the lower drag squeeze plate 252 and the floating plunger 260. Such upward movements of the lift plunger 250 will impart upward movement to the aforesaid drag section extension (lift sleeve 262 and drag upset or rectangular wall 264) by reason of the column of oil which is trapped within the upper end of the chamber 268 between the floating plunger 260 and the lift sleeve 262. The admission of oil under pressure through the port 269 will force the lift sleeve 262 downwardly with respect to the tubular floating plunger 260 as previously pointed out. It should be borne in mind when the operation of the machine is set forth in detail subsequently, that when either oil port 267 or 269 is employed as an inlet port to admit oil to the chamber 268, the other port will function in the manner of an outlet port to allow oil to escape from said chamber.

As shown in FIG. 2 of the drawings, the lift sleeve 262 of the ram assembly 34 carries a horizontal bar 274 from which there project upwardly a pair of pilot or leader pins 276. The latter are designed for cooperation with the aforementioned holes 122 which are associated with the superjacent drag flask section 20 as shown in dotted lines in FIG. 1. When the leader pins 276 are shifted upwards into the holes 122, the superjacent drag flask section 20 is held against lateral displacement with respect to the ram assembly 34.

THE UPPER PLATEN ASSEMBLY

Figure 18:
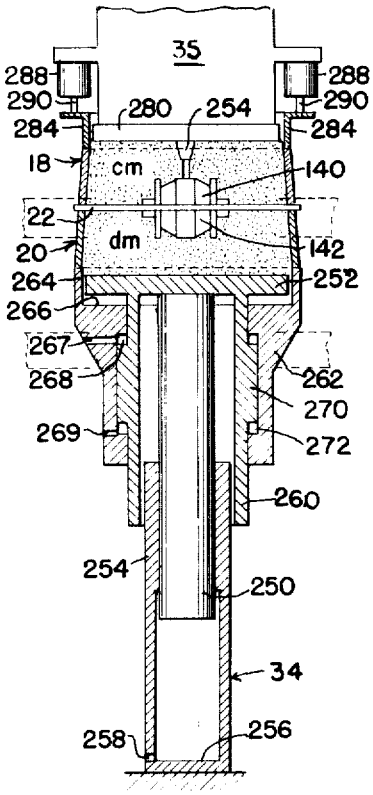
FIG. 18 is a schematic sectional view similar to FIG. 17 but illustrating the positions of the drag and cope flask sections and the parts of the ram assembly during the sandsqueezing operation which takes place between upper and lower squeeze plates.

As previously stated, the ram assembly 34 cooperates with the upper platen assembly 35 (see FIG. 2) during flask-handling operations at the working station WS and particularly during the squeeze operation wherein the lower squeeze plate 252 compresses the previously compacted sand in the associated cope and drag flask sections as shown in FIGS. 17 and 18 of the drawings. This upper platen assembly 35 includes a fixed or stationary platen proper or upper squeeze plate 280 which is supported in the upper region of the machine framework 14 and normally is encompassed by a rectangular cope upset frame 284. The lower rim of said cope upset frame is designed for edge-to-edge engagement with the upper rim of the subjacent cope flask section 18 during the squeeze operation as shown in FIG. 18. The cope upset frame 284 is vertically slidable on a pair of vertically extending guide rods 286 (see FIG. 2), and immediately after the squeeze operation, two double-acting hydraulic cylinders 288 having vertically-slidable plungers 290 associated therewith are adapted to be actuated to restore the cope upset frame 284 to its upper retracted position as shown in FIGS. 12, 19, 20, 21 and 22. When the cylinders 288 are reversely or oppositely actuated, the plungers 290 slide downwards with the result that the cope upset frame 284 is shifted downwards into the position in which it is shown in FIGS. 13 to 17, inclusive.

THE FLASK-STRIPPING MECHANISM

The stripping mechanism which is disposed at the mold-stripping station SS is illustrated in FIGS. 1, 2, and 24 to 32, inclusive. It is adapted effectively to receive in a separated condition a pair of sand-filled and compacted cope and drag flask sections 18 and 20 after such pair has been moved throughout a 90° arc from the core-setting station CS, to bring the two separated flask sections together in order to assemble or unite the cope and drag sand mold parts (designated cm and dm in the drawings) which are contained in the flask sections 18 and 20, respectively, to provide a bottom board support for the assembled mold, and finally to push the assembled flask sections bodily as a unit from the assembled composite sand mold cm and dm, leaving the latter resting on the bottom board.

During the following discussion of the flask-stripping mechanism at the stripping station SS, it should be borne in mind that this mechanism as disclosed in FIGS. 24 to 32 is purely schematic in its representation and the disclosure of these views does not necessarily correspond to the structural details of FIGS. 1 and 2.

Figure 28:
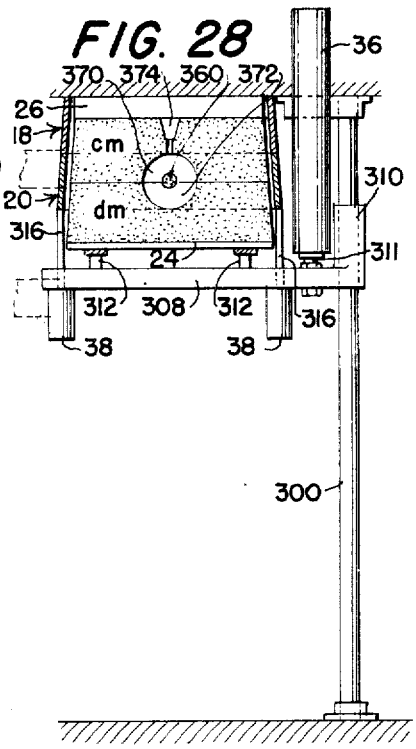
FIG. 28 is a schematic side elevational view similar to FIG. 27 but illustrating the actual stripping operation wherein the cope and drag flask sections are stripped bodily and in unison from the assembled complemental mold parts.
Figure 29:
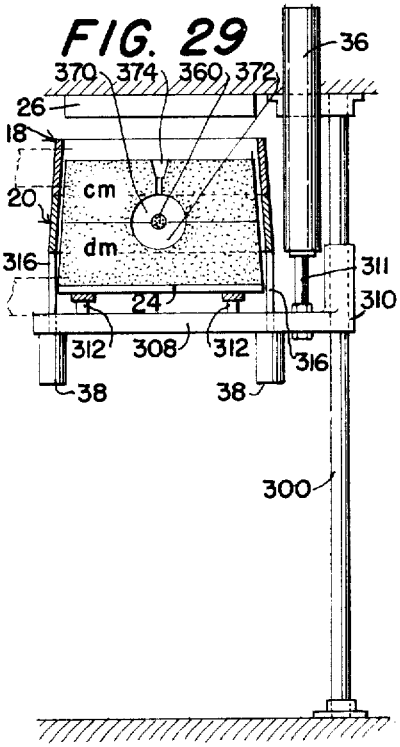
FIG. 29 is a schematic side elevational view similar to FIG. 28 but illustrating a downward movement of the lift bracket preparatory to restoring the cope and drag flask sections to their normal turntable-supported positions within the stripping station.

Referring now particularly to FIGS. 1 and 2 of the drawings, the flask-stripping mechanism involves in its general organization a pair of vertical guide rods 300, the latter being disposed in spaced apart relationship transversely of the stripping station SS and also being supported at their upper and lower ends by angle brackets 302 and 304 which are fastened, respectively, to the intermediate transverse bars 72 and 70 of the machine framework 14. Slidable vertically on the guide rods 300 is a stripping carriage 306 which comprises a horizontal platform 308. The latter is provided at its inner corners with two tubular guide sleeves 310 which encompass the guide rods 300 and slide vertically thereon. The carriage 306 is vertically shiftable under the control of a vertically slidable plunger 311 which is associated with the aforementioned hydraulically-operable primary stripping cylinder 36. The carriage 306 further includes or comprises on the upper surface of the platform 308 a pair of spaced apart, horizontally extending skids 312, the latter being adapted successively to receive thereon the aforementioned bottom boards 24 (see FIG. 33) as they are fed thereto from the stack S under the control of the ejector mechanism 30. The skids 312 serve to maintain the boards 24 in an elevated position above the effective level of the platform 308. Additionally, the carriage 306 serves to support the aforementioned four secondary flask-stripping cylinders 38. The latter depend below the platform 308 of the carriage 306 and have vertically-slidable stripping plungers 316 which project vertically upwardly above the effective level of said platform and which, normally, in their retracted position, underlie the effective level of the skids 312. Upon energization of the secondary cylinders 38, the plungers 316 are adapted to be projected upwardly to the position wherein they are illustrated in FIGS. 28, 29 and 30 so that the upper or distal ends thereof are disposed above the level of the skids 312 for the purpose of engaging and raising the superjacent cope flask section 18 for flask-stripping operations as will be made clear presently when the operation of the machine is described hereafter.

Figure 24:
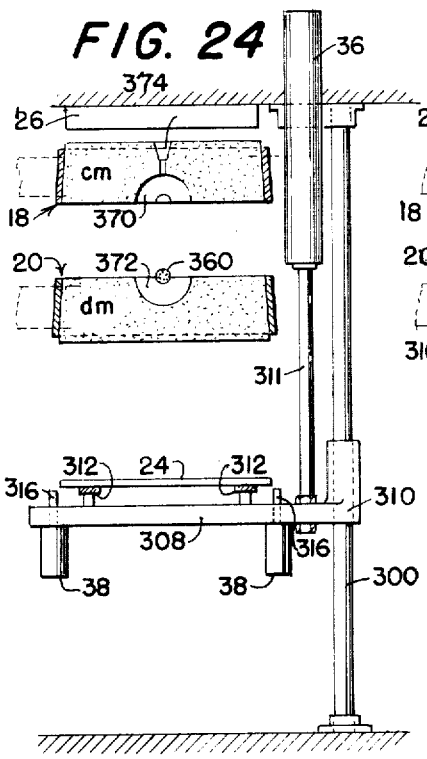
FIG. 24 is a side elevational view, largely schematic in its representation, illustrating the mold-stripping mechanism at the stripping station in the normal position which it assumes at the time the sand-filled and compacted cope and drag flask sections are indexed into respective normal supported positions at the stripping station.

The carriage 306 is shiftable vertically upwardly on the guide rods 300 from the lowered position in which it is shown in FIGS. 2 and 24 wherein the bottom board 24 is disposed an appreciable distance below the level of the superjacent drag flask section 20 which has been brought into position at the stripping station SS by the lower turntable spider 82 of the turntable 16 in order that such bottom board will pick up the drag flask section 20 and force it upwardly against the superjacent cope flask section 18 and then carry both flask sections further upwardly so that the thus assembled mold parts cm and dm within the two flask sections will be projected against the aforementioned stationary reaction platen 26 and held there while the plungers 316 of the cylinders 38 perform their flask-stripping operation. The platen 26 is fixedly mounted on a bracket 318 (see FIG. 2) which is suitably mounted on the side bars 64 of the machine framework 14. Such vertical movement of the carriage is effected under the control of the aforementioned hydraulically-operable primary cylinder 36, the latter being fixedly secured to the upper portions of the corner posts 68 of the framework 14 by means of a clamping bracket 319.

THE BOTTOM BOARD FEEDING AND MOLD-EJECTING MECHANISM

Referring now to FIGS. 1, 33 and 34 of the drawings, the previously mentioned bottom board feeding and moldejecting mechanism 30 is in the vicinity of the stripping station SS and includes a bottom board supporting feed table 320 which is positioned on one side of the machine 10, and a mold-receiving discharge table 322 on the opposite side of the machine, both tables straddling said stripping station of the machine as shown in FIGS. 1, 3, 33 and 34. The table 320 is provided with legs 324 and serves to support a pair of spaced apart, horizontally extending skid rails 326 at substantially the same horizontal level as that of the skids 312 on the platform 308 of the vertically movable carriage 306 when the latter is in its lowermost position.

The table 320 of the mechanism 30 serves to support a stacking frame 328 for the previously mentioned stack S of bottom boards 24, and also to support the hydraulically-operable ejecting cylinder 40. The cylinder 40 is secured to the outer or far end of the table 320 by a bracket 322 and is positioned so that a horizontally extending and slidable pick-off plunger 334, which is associated therewith and normally assumes the retracted position in which it is shown in FIG. 33, is adapted, when extended in successive actuations, to engage the lowermost bottom board 24 in the stack S and impel the same inwardly along the skid rails 326 and ultimately onto the skids 312 on the platform 308 of the carriage 306 at the stripping station SS. The outer end of the plunger 334 of the cylinder 40 carries two spaced apart rollers 335 which ride on two horizontal guide rails 336 which are carried by and suspended from the feed table 320. The rollers 335, while traveling on the guide rails 336, establish the proper level for the plunger 334 so that only the lowermost bottom board 24 in the stack S will be engaged at the time the plunger is projected in response to actuation of the cylinder 40.

It is to be noted that during any given projection of the plunger 334, a bottom board 24 is pushed from beneath the stack S to a dwell position where it remains momentarily on the skid rails 336. Thereafter, during the next succeeding projection of the plunger, a second bottom board is pushed from beneath the stack so that it engages the first board and causes the latter to be pushed forwardly or inwardly onto the aforementioned skids 312. After the first board has performed its function of raising the associated cope and drag flask sections 18 and 20 and the other flask-handling operations at the stripping station SS have been completed, thus resulting in the positioning of the assembled composite sand mold on the first bottom board 24 as shown in FIG. 33, a third bottom board is pushed from beneath the stack S and the second board then engages the first board and slides the same from the skids 312 onto the discharge table 322 which, as previously pointed out, is positioned alongside the machine 10. At this point, the second board is positioned on the carriage 306 in readiness for the similar operations at the station SS. From the discharge table 322, the bottom boards 24 with the assembled composite sand molds thereon may be manually or otherwise successively removed.

OPERATION OF THE MACHINE

General Considerations

In reciting the operation of the present sand mold-forming machine, since the four paired cope and drag mold flask sections 18 and 20 shift simultaneously in a circular path throughout an arc of 90° during each indexing operation of the turntable 16, with each pair of flask sections returning to its original position at the end of a complete machine cycle, it will be considered that one complete machine cycle involves four such indexing operations with a complete revolution of each pair of flask sections taking place about the central vertical axis of the turntable. Considerably the machine at the time any given run of composite sand molds is to be effected and with four pairs of empty flask sections in the machine at the four stations WS, CS, SS and DS, the first quarter cycle involves handling of a pair of flask sections at the working station SS to the point where the sand blow operation is effected, and then further handling of such sections to the point where the completed cope and drag sand mold parts are contained in the spider-supported cope and the drag flask sections 18 and 20, followed by the shifting of the pair of sand-filled and compacted cope and drag flask sections 18 and 20 from the working station WS to the core-setting station CS, the shifting of a second pair of initially empty flask sections from the core-setting station CS to the stripping section SS, the shifting of a third pair of initially empty flask sections from the stripping station SS to the idle or dwell station DS, and the shifting of a fourth pair of initially empty flask sections from the dwell section DS to the working station WS to replace the first pair of flask sections which were transferred in a sand-filled and compacted condition from such station to the core-setting station CS.

The second quarter cycle of machine operation involves the production of a second pair of mold parts at the working station WS followed by transfer thereof to the core-setting station CS; the manual setting of a core at the core-setting station by placing the core on the formed drag mold part then at such station, and the transfer of the mold parts with the set core to the stripping station SS; the transfer of an initially empty pair of mold sections from the moldstripping station SS to the dwell station DS; and the transfer of an initially empty pair of mold sections from the dwell station DS to the working station WS.

The third quarter cycle of machine operation involves the production of a third pair of cope and drag mold parts at the working station WS and their transfer to the coresetting station CS: the transfer of the second pair of juxtapositioned core-equipped mold parts and their respective separated flask sections from the core-setting station to the stripping station; the assembly of a pair of mold parts, the placement of the assembled mold on a bottom board at the stripping station, the ejection of the bottom board and mold from the machine at the stripping station; and the transfer of a pair of empty flask sections to the dwell station; and the transfer of a pair of empty flask sections from the dwell station DS to the working station WS.

The fourth quarter of the machine cycle involves the production of a fourth pair of mold parts at the working station WS and transfer thereof to the core-setting station CS; the setting of a core in the juxtapositioned third pair of mold parts at the core-setting station and the transfer thereof to the stripping station SS; the assembly of the second pair of mold parts; the ejection of the second mold on a bottom board at the stripping station, and the transfer of the empty flask sections to the dwell stations; and the transfer of empty flask sections from the dwell station to the working station WS.

Because the machine commenced its operation with four pairs of empty cope and drag flask sections 18 and 20, only two completed composite molds were discharged from the machine at the stripping station Ss during this first cycle of operation. However, with filled flask sections remaining at the core-setting station CS and with filled flask sections remaining at the stripping station at the end of the first complete molding machine cycle, the second cycle, as well as all succeeding cycles, will be productive of four complete molds, each positioned on a bottom board.

Turntable-Indexing Operations

As previously pointed out, turntable indexing operations take place at the end of each quarter-cycle of machine operation although the net result would be substantially the same if such operations were caused to take place at the beginning of each quarter cycle. Such turntable indexing is initiated by energizing the hydraulic cylinder unit 228 at the distal end of the Geneva drive arm 226 (see FIGS. 1, 2 and 4) in order to project the roller-equipped, spring-biased shot pin 230 into the guideway or guide slot which exists between the anti-friction wear liners 210 of the adjacent lower spider arm 182, after which the Geneva actuator 33 is supplied with oil under pressure in order to actuate the same and effect swinging movement of the Geneva drive arm 226 in a counterclockwise direction and consequent swinging movement of the associated or adjacent spider arm 182 in a clockwise direction in the usual manner of conventional Geneva drive mechaisms, thus causing the turntable 16 as a whole to rotate throughout an angle of 90°. At the end of the Geneva arm movement, the cylinder 240 (see FIG. 2) is actuated so as to cause the shot pin 216 to be projected upwardly into the adjacent and overlying locating pocket 212, thus locking the turntable in its indexed position. In such position, two adjacent pairs of upper and lower spider arms 180 and 182 are in proper position at the working station WS for flask-handling movements at such station.

Machine Functions at the Working Station

A schematic representation of the various machine functions which take place at the working station WS is illustrated in FIGS. 12 to 21, inclusive. In these views, substantially all of the machine framework has been omitted in the interests of clarity and the representation of the cope flask section 18, the drag flask section 20, and the match plate 22 has been simplified by the omission of such flask or match plate adjuncts as the flask-supporting flanges, vents or screen units, blow slots, leader pins, and the like. Furthermore, no portions of the flask-supporting spider arms 180 and 182 have been shown.

Figure 13:
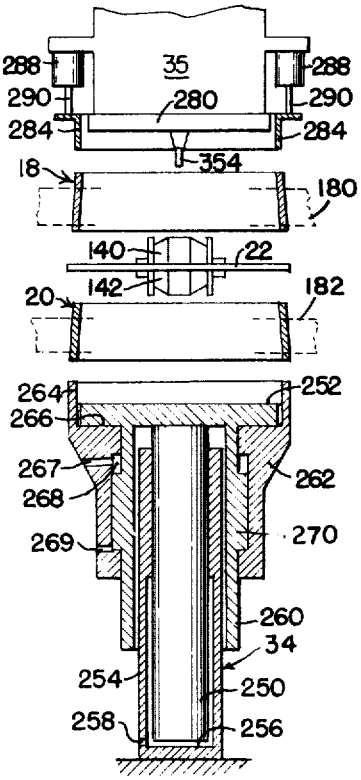
FIG. 13 is a schematic sectional view similar to FIG. 12 but illustrating a preliminary movement of a certain part of the ram assembly which takes place at the commencement of the machine cycle and involves upward shifting of the lift sleeve of the assembly together with the associated cope upset while the lift plunger of the ram assembly remains stationary.
Figure 14:
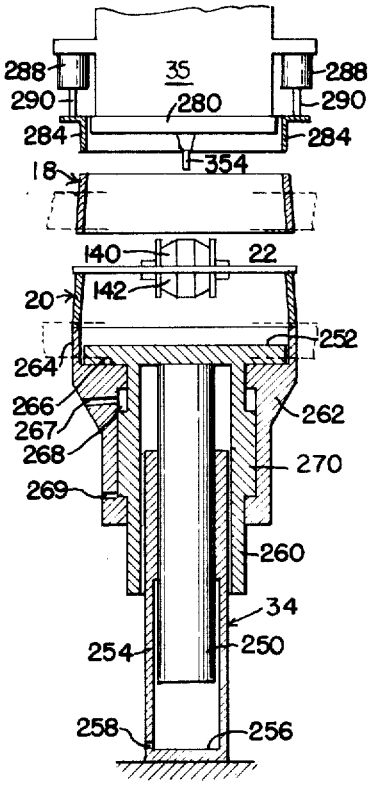
FIG. 14 is a schematic sectional view similar to FIG. 13 but illustrating an upward lift plunger movement which takes place in order to lift the drag flask section against the match plate.

In the start position of the molding machine 10, all of the components of the arm assembly 34 assume the positions in which they are shown in FIG. 12 and at the commencement of any given machine cycle, oil under pressure is admitted to the port 267, thus causing the lift sleeve 262 (lower drag flask section extension) to rise relatively to the lower squeeze platen 252 to the position of FIG. 13. At the same time, the cylinders 288 are actuated to lower the rods 290 and cause corresponding movement to the cope upset frame 284. The associated cope and drag flask sections 18 and 20 remain supported, respectively, on the upper and lower turntable spiders 80 and 82. Oil under pressure is then admitted to the port 258 at the lower end region of the vertically extending cylinder body 254, thus driving or forcing the central lift plunger 250 upwardly and causing the lift sleeve 262 and said plunger 250 to rise in unison so that the rim of the rectangular wall or drag upset 264 forming part of the lift sleeve 262 (drag flask section extension) engages the lower rim of the superjacent flask section 20 as shown in FIG. 14. Continued upward movement of the lift sleeve 262 and the plunger 250 in unison raises the superjacent drag flask section 20 and brings the upper rim thereof into engagement with the lower surface of the match plate 22 as also shown in FIG. 14. As the lift plunger 250 and the lift sleeve 262 rise still further, the match plate 22 is forced upwardly so as to engage the lower rim of the turntable-supported superjacent cope flask section 18 as shown in FIG. 15. The supply of oil under pressure to the port 258 is continued until the lift plunger 250, the lift sleeve 262, the drag flask section 20, the match plate 22, and the cope flask section 18 have all moved upwardly to bring the upper rim of the cope flask section into engagement with the lower rim of the cope upset frame 284 as shown in FIG. 16.

At this time, the blow operation is initiated by blowing sand simultaneously through two distribution heads 350 and 352 (see FIG. 17) into the mold cavities in the two flask sections 18 and 20. The distribution head 350 extends downwards through the upper squeeze plate 80, and the distribution head 352 extends laterally through the blow slot 130 in one of the end walls 110 of the drag flask section 20. The blowing of sand is continued until the two mold cavities within the two flask sections are filled and the blown sand is compacted in a preliminary manner in said flask sections. During the blow operation, the lower drag section squeeze plate 252 is located in place by the column of oil in the lower interior portion of the cylinder body 254, the lift sleeve 262 is located in place or against vertical displacement by the trapping of oil under pressure in the upper portion of the chamber 268 and the cope upset frame 284 is locked against vertical displacement by locking the plungers 290 in their down position through the medium of proper operation of the double-acting cylinders 288.

The manner in which sand issuing from the hopper 76 is caused to pass through the shut-off gate mechanism 78 and the magazine 75 is not illustrated in the drawings, only the distribution heads 350 and 352 being disclosed. These sand-feeding instrumentalities are substantially the same as corresponding instrumentalities which are shown and described in aforementioned U.S. Pat. No. 3,648,759 and reference may be had to such patent for a full understanding of such instrumentalities.

After completion of the blow operation and the cavities in the two flask sections have been filled with compacted sand, the oil pressure at the port 267 is relieved, while at the same time the oil pressure in the two hydraulic cylinders 288 is also relieved. At this time, continued upward movement of the lift plunger 250 and the lower squeeze plate 252 causes further compacting or compressing of the sand in the drag flask section cavity against the match plate 22 which, in turn, further compacts or compresses the sand in the cope flask section cavity against the upper platen or squeeze plate 280, thereby-effecting the squeeze operation and producing completed cope and drag mold parts cm and dm in the mold cavities in the drag and cope flask sections. In connection with this squeeze operation, it is to be noted that a sprue 354 (see FIGS. 12 to 22, inclusive) which establishes the usual sprue passage leading to the upper mold part cm is of a telescopic nature in order that it will not be pinched between the aforementioned upper pattern part 140 and the upper platen or squeeze plate 280.

Figure 19:
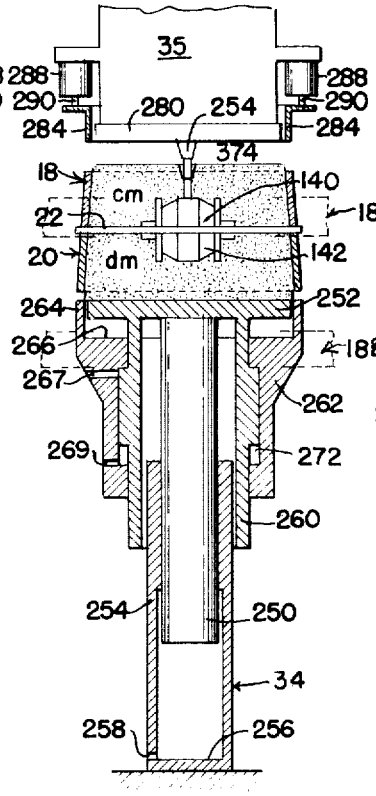
FIG. 19 is a schematic sectional view similar to FIG. 18 but illustrating the downward movement of the lift plunger of the ram assembly which takes place immediately after the sand-squeezing operation.

The aforementioned squeeze operation is followed by actuation of the cylinders 288 so as to move upwards the cope upset frame 284 (see FIG. 19) and also to effect a pattern draw operation whereion oil pressure at the port 258 is relieved while oil under pressure is supplied to the port 269. This has the effect of causing downward retraction of the lift sleeve 262 with respect to the lower or drag squeeze plate 252 and also causing the lift plunger 250 and its associated squeeze plate 252 and tubular floating plunger 260 to shift downwardly, thus lowering the two flask sections 18 and 20, together with the now-completed cope and drag mold parts cm and dm, away from the upper platen or squeeze plate 280 as shown in FIG. 19.

Figure 20:
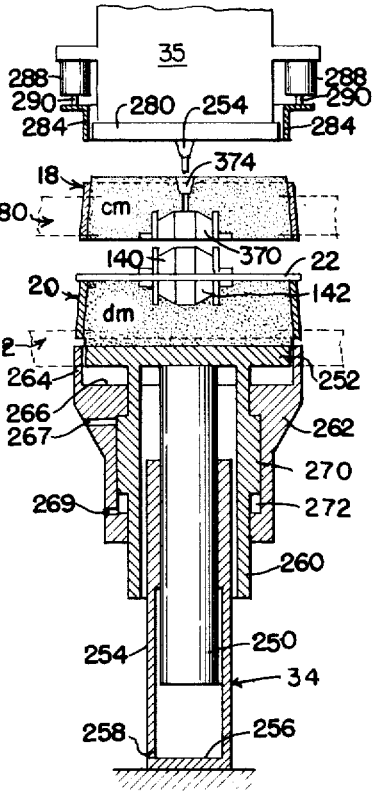
FIG. 20 is a schematic sectional view similar to FIG. 19 but illustrating a further downward movement of the lift plunger of the ram assembly which takes place in order to restore the cope flask section to its normal supported position on the turntable.
Figure 21:
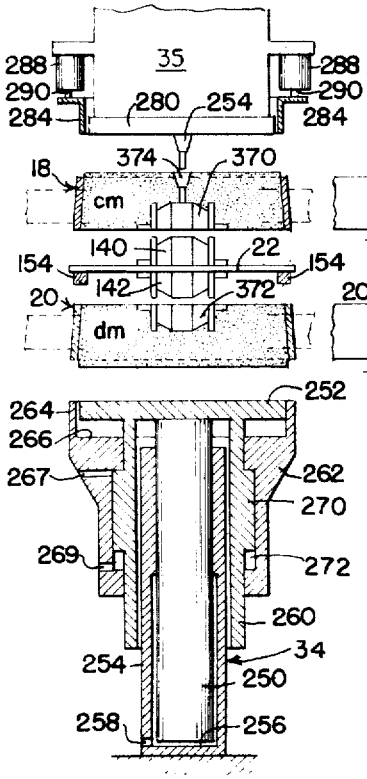
FIG. 21 is a schematic sectional view similar to FIG. 20 but illustrating a still further downward movement of the lift plunger of the ram assembly which takes place in order to restore both the sand-filled and compacted flask sections, and also the match plate, to their respective normal supported positions.
Figure 22:
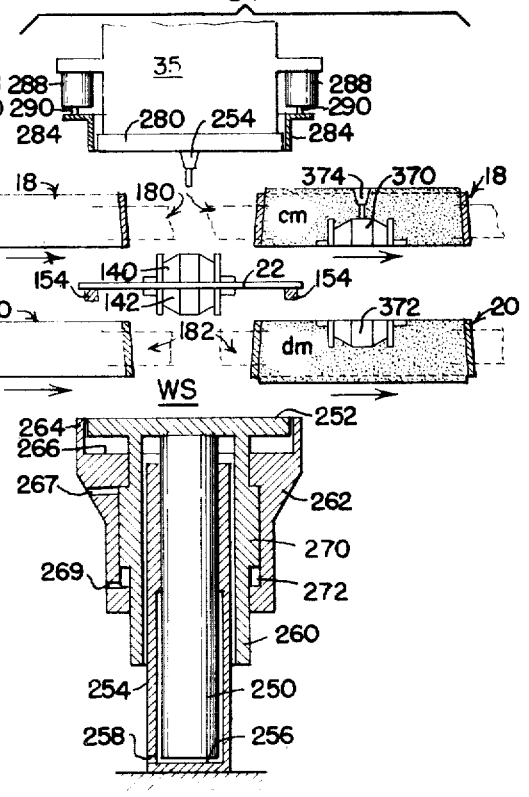
FIG. 22 is a schematic sectional view similar to FIG. 21 but illustrating the sand-filled and compacted cope and drag flask sections indexed away from and out of the working area or station of the machine, and also showing or illustrating new empty cope and drag flask sections being indexed into the working station in order to replace the withdrawn flask sections.

As shown in FIG. 20, continued downward movement of the lift plunger 250 causes the cope flask section 18 and its contained cope mold part cm to come to a position of rest on the adjacent pair of upper spider arms 180 and assume the position in which it is shown in FIG. 20 while the lower drag flask section 20 together with its contained drag mold part dm continues to be lowered. Further downward movement of the lift plunger 250 brings the match plate 22 to a position of rest on the match plate supporting bracket 152 as shown in FIG. 20, while still further downward movement of the lift plunger brings the drag flask section 20 to a position of rest on the adjacent pair of lower spider arms 182 and the various flask and ram components assume the positions in which they are shown in FIG. 21. It is to be noted that, in this view, the variations flask and match plate positions, as well as the condition of the ram assembly 34, are identical with the disclosure of FIG. 12 except for the fact that in FIG. 12 the flask sections 18 and 20 are empty. However, at the completion of the first quarter cycle of machine operation, the cope and drag flask sections 18 and 20 with the cope and drag mold parts cm and dm therein will be shifted out of the working station WS while an empty pair of flask sections will be conducted into such station as shown in FIG. 22, this latter view representing the positions of the flask sections at approximately 135° in the 360° total machine cycle.

Machine Functions at the Core-Setting Station

At the end of the first quarter cycle of machine operation and after the mold parts and the flask sections which encompass them have been transferred to the core-setting station CS as shown in FIG. 23, no automatic flask handling or other operation take place, such station constituting, in effect, a dwell area where, if desired, a core such as the core 360 may be manually positioned in place on the drag mold part dm while the latter's encompassing drag flask section 20 rests on the two adjacent lower spider arms 182, it being understood that when the two flask sections are disposed at the core-setting station CS, the cope flask section 18 is in raised or separated relation with the drag flask section 20. The only machine function which occurs at this staion CS is a movement of the flask sections 18 and 20 into such station at the end of the first quarter machine cycle and a movement of these flask sections away from the station CS at the commencement of the second quarter cycle of machine operation.

It is to be noted at this point that, unlike a conventional match plate molding machine where core setting operations are performed at a main working station where vertical flask movements are carried out in the performance of the squeeze and other operations, the core setting operation of the present machine is carried out at a region remote from the working station where the cope and drag flask sections are fixedly supported at different levels and are thus incapable of closing upon each other so that there will be no danger to the hands of the operator incident to closing of the mold flask sections upon each other.

Machine Functions at the Stripping Station

Referring now to FIGS. 24 to 32, inclusive, FIG. 24 represents the positions of the machine parts at the commencement of the third quarter machine cycle. At this time, the bottom board supporting platform 308 of the vertically-movable carriage 306 remains in its lowermost position with a pre-positioned bottom board 24 resting on the skids 312 while the mold-containing flask sections 18 and 20 are disposed in their spaced apart positions on the adjacent pairs of upper and lower spider arms 180 and 182 which support them.

Figure 25:
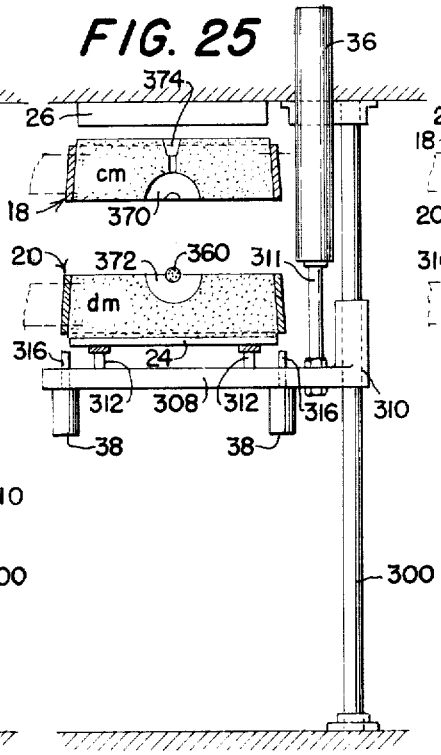
FIG. 25 is a schematic side elevational view similar FIG. 24 but illustrating the preliminary upward movement of a certain mold-closing lift bracket into effective lifting engagement with the filled drag flask section prior to upward shifting of the latter.
Figure 26:
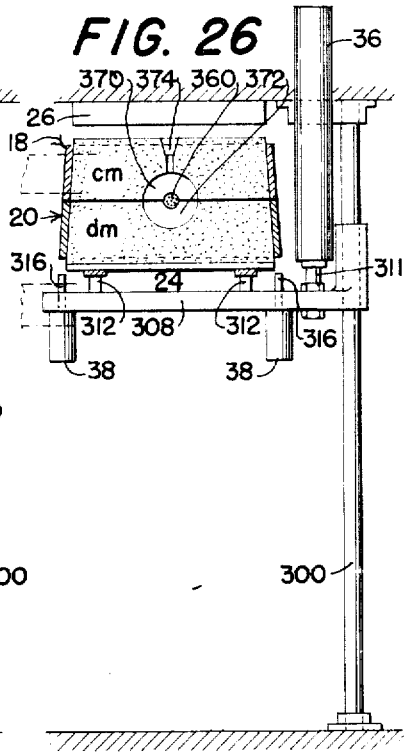
FIG. 26 is a schematic side elevational view similar to FIG. 25 but illustrating a further upward shifting movement of the lift bracket so as to bring the filled drag flask section into initial effective lifting engagement with the filled cope flask section.

Flask-handling operation at the mold-stripping station SS are commenced by supplying oil under pressure to the primary stripping cylinder 36 so as to retract the plunger 311 thereof, thereby raising the platform 308 unti the bottom board 24 thereon engages the underneath surface or side of the drag pattern part dm as shown in FIG. 25. Continued upward movement of the platform 308 causes the drag flask section 20 to be raised by the bottom board 24, which at the time functions in the manner of a lifting platen, so that the two flask sections 18 and 20 become "closed" on each other and the mold parts cm and dm become united or assembled to create the completed composite sand mold as shown in FIG. 26. Still further upward movement of the platform 308 is a prearranged gentle manner brings the upper face of the assembled composite mold into engagement with the reaction platen 26 as shown in FIG. 27, upward movement of the two abutting flask sections in a gentle manner is required in order to prevent the mold from being crushed between the board 24 and the platen 26, when the completed sand mold is in the position shown in FIG. 27 the plunger 311 of the cylinder 36 is fully retracted.

Figure 27:
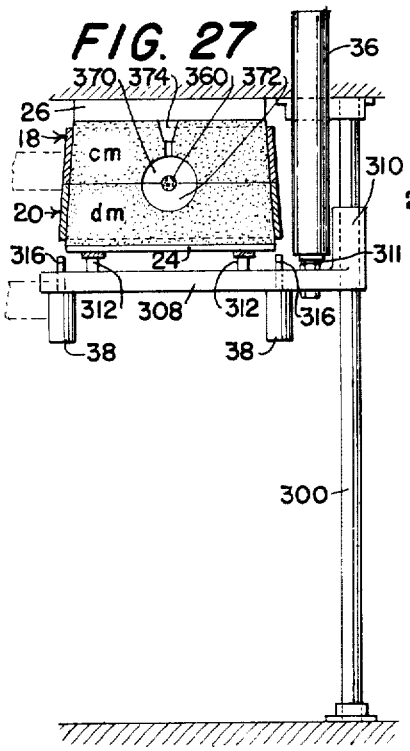
FIG. 27 is a schematic side elevational view similar to FIG. 26 but illustrating a still further upward movement of the lift bracket so as to bring the filled drag and cope flask sections into operative relationship with respect to a stripping platen which is employed in connection with the machine.

With the platform 308 in the position in which it is illustrated in FIG. 27, the complete composite mold is clamped under very low pressure between the bottom board 24 and the reaction platen 26 and, at this time, the four secondary stripping cylinders 38 are supplied with oil to extend upwardly the plungers 316 thereof as shown in FIG. 28, thus forcing the drag and cope flask sections 20 and 18 upwardly and stipping them both from the mold. Thereafter, the primary cylinder 36 is actuated to lower the platform 308 with the plungers 316 still extended as shown in FIG. 29.

As soon as the cope flask section 18 reaches the effective level of the adjacent pair of spider arms 180 at the mold-stripping station SS, this flask section 18 is deposited on such arms and the platform 308, the drag flask section 20 and the mold continue downwardly with the four plungers 316 still extended as shown in FIG. 30. When the drag flask section 18 reaches the effective level of the adjacent pair of lower spider arms 182, this flask section likewise is deposited on such spider arms while the platform 308 with the mold thereon continues its downward movement until the plunger 311 becomes fully extended and the parts assume the positions in which they are shown in FIGS. 31 and 32. At this time, the bottom board on the platform 308 has attained the same horizontal level as that of the lowermost board of the stack S on the stacking frame 326. At this point in the third quarter of the machine cycle, bottom board and mold ejection operations take place.

Mold-Ejecting Operations

Bottom board and mold-ejection operations are performed while the platform 308 and the complete composite mold thereon remain in their lowermost positions of rest as shown in FIGS. 32 and 34 and immediately prior to performance of the turntable-indexing operation which completes this third quarter of the machine cycle. Ejection is accomplished by energizing the ejection cylinder 40 to project the plunger 334 and thus slide the lowermost bottom board 24 and in the stack S along the skid rails 326 to a position of rest. During such sliding movement of the bottom board 24, the preceding board is pushed forwardly into the mold-stripping station SS in order to replace the mold-supporting bottom board on the skids 312 and this latter bottom board, together with the mold which is carried thereby, is ejected or pushed onto the discharge table 322. A subsequent indexing operation of the turntable 16 and its associated spiders 80 and 82 serves to transter the empty flask sections 18 and 20 from the stripping station SS to the dwell station DS as heretofore described.

Machine Functions at the Dwell Station

The only functions which take place at the dwell station DS are selective functions which may be manually performed on the flask sections 18 and 20 if desired. These may consist of flask section removal for the purpose of cleaning or replacement or for inspection of machine parts during the dwell period. Otherwise, the postions of the cope and drag flask sections 18 and 20 on their respective spider arms 180 and 182 are not disturbed and these flask sections await a turntable-indexing operation at the end of the third quarter of the machine cycle for transfer thereof back to the working staton WS in an empty condition.

It will be understood that during each quarter cycle of machine operation as outlined above, the successively described machine functions are not the only functions which are performed at the stated times. In each of the four stations WS, CS, SS and DS, flask-handling or other operations are taking place simultaneously so that a pair of empty flask sections 18 and 20 enter the working station WS while a completely assembled mold is ejected from the stripping station SS.

The Assembled Mold

As is the case in connection with conventional match plate molding machines, for example, the machines of the aforementioned U.S. Pat. Nos. 3,229,336 and 3,648,759, the individual cope and drag mold parts cm and dm come into existence during the blow operation which is illustrated in FIG. 17 and are completed by the squeeze operation which is illustrated in FIG. 18. It is to be noted that at this time, mold section cavities 370 and 372 (see FIGS. 20 and 21) are established in the cope and drag mold parts cm and dm, as also is a sprue channel or gate 374 which leads to the mold cavity 370 in the cope mold part cm. In the assembled mold, the two mold cavities 270 and 272, in combination with each other, establish a casting cavity into which molten metal ultimately is introduced through the sprue channel or gate 374.

The invention is not to be limited to the exact arrangement of parts shown in the accompanying drawings or described in this specification, nor to the specific order of the heretofore set forth machine functions, since various changes in the details of construction and in such order of machine functions may be resorted to without departing from the spirit or scope of the invention. For example, whereas in describing each quarter cycle of machine operation, it has been considered that turntable-indexing operations take place near the end of each quarter cycle. If desired, any given machine cycle may be considered to commence with an immediate indexing operation of the turntable, after which the remainder of the cycle will involve the various flask-handling or other operations set forth herein. Additionally, whereas the support 152 for the match plate 22 is shown herein as being a fixed support, under certain circumstances, it may be found desirable to provide a shiftable support by means of which different patterns may be "shuttled" into and out of position within the working station WS. Such a shiftable support may carry two or more patterns which are selectively positionable in the working station, either under manual or hydraulic control. Still further, it is contemplated that under certain circumstances, it may be found desirable to omit the dwell or idle stations DS and cause the working station WS, the core-setting station CS, and the mold-stripping station SS to assume positions which are circumferentially and equally spaced about the vertical axis of the turnable 16, in which case the Geneva drive mechanism would be designed to impart 120° increments of rotation to the latter. Therefore, only insofar as the invention is particularly pointed out in the accompanying claims is the same to be limited.

Having thus described the invention what we claim as new and desire to secure by Letters Patent is:

1. In a cyclicly-operable mold-forming machine for simultaneously producing cope and drag mold parts and thereafter assembling them to produce a composite mold, in combination, a framework establishing a working station where the mold parts are produced and a stripping station where said mold parts are assembled, a fixed match plate support located at said working station, a pattern-carrying match plate associated with said support, upper and lower squeeze plates positioned above and below said support, an upper reaction platen and a lower lifting platen located at said stripping station, a flask carrier having a pair of upper and lower vertically spaced and relatively fixed flask supports, cope and drag flask sections normally and removably resting by gravity on said flask supports respectively and positioned in spaced apart relation, said carrier being movable between a first position at said working station wherein said flask supports straddle the match plate support and a second position at said stripping station wherein said flask supports are interposed between said platens, means located at said working station and operative when the carrier is in its first position to lift the match plate and the flask sections vertically from their respective supports, to assemble said match plate and flask sections to define upper and lower flask cavities on opposite sides of the match plate, to introduce sand *by air under pressure* into such cavities *simultaneously while the cope flask section is in overlying relation with the drag flask section* and *then* compress the [ same ] *sand in said cavities in order* to produce cope and drag mold parts within the flask sections, and to restore the match plate and also the flask sections with the mold parts therein to their normal positions on their respective supports, means located at said stripping station and operative when the carrier is in its second position to move said flask sections and platens relatively to one another so as to lift the flask sections vertically from their respective supports, to assemble said flask sections upon each other in order to establish the composite mold, to force the mold from the flask sections, and to restore the empty flask sections to their normal positions on their respective supports, and means for successively moving said carrier between said first and second positions.

2. In a cyclicly-operable mold-forming machine, the combination set forth in claim 1 and wherein said carrier is in the form of a rotary turntable mounted on said framework midway between said stations, said flask supports are eccentrically disposed on and movable bodily with said turntable, and said means for successively moving said carrier between its first and second positions comprises an intermittent unidirectional driving mechanism for the turntable.

3. In a cyclicly-operable mold-forming machine, the combination set forth in claim 1 and wherein said carrier is in the form of a rotary turntable mounted on said framework midway between said stations, said flask supports are eccentrically disposed on and movable bodily with said turntable, said framework further establishes a core-setting station and a dwell station, the working, core-setting, stripping and dwell stations are quadrilaterally disposed about said turntable, and said means for successively moving the carrier is in the form of an indexing mechanism which is effective during each actuation thereof to rotate the turntable unidirectionally throughout an angle of 90° whereby said flask supports, in moving from the working station to the stripping station, are caused to dwell at the core-setting station in order to permit a core to be inserted between the separated cope and drag mold parts, and in moving from the stripping station to the working station are caused to dwell at the dwell station.

4. In a cyclicly-operable mold-forming machine, the combination set forth in claim 1 and wherein said carrier is in the form of a rotary turntable mounted on said framework, said flask supports are eccentrically disposed on and movable bodily with said turntable, said framework further establishes a core-setting station, said working station, core-setting station and stripping station are circumferentially spaced about said turntable, and said means for successively moving the carrier is in the form of an indexing mechanism which is effective upon successive actuations thereof to move said carrier from the working station to the core-setting station, from the core-setting station to the stripping station, and from the stripping station back to the working station.

5. In a cyclicly-operable mold-forming [ mechanism ] *machine* for simultaneously and successively producing cope and drag mold parts and thereafter assembling such parts to produce a composite mold, in combination, a framework establishing a working station where the mold parts are produced and a stripping station where said mold parts are assembled, a match plate support located at said working station, a pattern-carrying match plate resting normally on said support, and upper and lower squeeze plates above and below said support, an upper reaction platen and a lower lifting platen located at said stripping station, a rotatable turntable mounted on said framework midway between said stations, a plurality of pairs of upper and lower vertically spaced and relatively fixed flask supports eccentrically mounted on said turntable in circumferentially spaced relationship, cope and drag flask sections normally resting by gravity respectively on each pair of upper and lower supports, means for successively indexing said turntable throughout a predetermined degree in order to bring one pair of flask supports into vertical register with said match plate at said working station with the flask sections thereon straddling said match plate and simultaneously to interpose another pair of flask supports between said platens at the stripping station, means at said working station and operative in between turntable-indexing operations to move said match plate, the flask sections which straddle the same, and the squeeze plates relatively to one another and in such manner as to lift said match plate and flask sections vertically from their respective supports, to assemble said match plates and flask sections to define upper and lower flask cavities on opposite sides of the match plate, to introduce sand *by air under pressure simultaneously* into such cavities and *then* compress the [ same ] *sand* in the cavities to produce cope and drag mold parts within the flask sections, and to restore the match plate and flask sections with the mold parts therein to their normal positions on their respective supports, and means at said stripping station and effective in between turntable-indexing operations to move said flask sections and platens relatively to one another so as to lift the flask sections vertically from their respective supports, to assemble the flask sections with the mold parts thereon upon each other and thus establish a composite mold, to force the latter from the assembled flask sections, and to restore the empty flask sections to their normal positions on their respective supports.

6. In a cyclicly-operable mold-forming machine, the combination set forth in claim 5 and wherein the pairs of upper and lower flask supports on the turntable are four in number and are disposed on the turntable in quadrilateral relationship, the indexing means for the turntable is effective during each indexing operation to rotate the turntable unidirectionally throughout an angle of 90°, and the working station and stripping station are disposed on opposite sides of the turntable in diametrically opposed relationship.

7. In a cyclicly-operable mold-forming machine, the combination set forth in claim 6 and wherein said turntable comprises a vertically disposed column, and vertically spaced upper and lower turntable spiders mounted on the column, the spiders include each a series of four radially diverging spider arms on which said flask supports are mounted, and each flask section extends in chordal fashion on, and bridges the distance between, two adjacent spider arms.

8. In a cyclicly-operable mold-forming machine, the combination set forth in claim 7 and wherein each flask support is provided with *at least one* upstanding leader [ pins ] *pin* which [ project ] *projects* into *a* pilot [ holes ] *hole* in associated relation with the [ corresponding ] *associated* flask [ sections ] *section* [ for establishing ] *whereby* precise circumferential and radial positioning of the flask sections on their respective turntable spiders *is established.*

9. In a cyclicly-operable mold-forming machine, the combination set forth in claim 7 and wherein the means for successively indexing said turntable comprises a Geneva drive mechanism which embodies a Geneva actuator mounted on said framework adjacent to the periphery of the turntable and having a vertically disposed oscillatory output shaft, and a Geneva arm having its proximate end fixedly secured to said output shaft and provided at its distal end with a retractable and extensible shot pin which is adapted, when extended, to be successively engageable with a series of elongated radially extending guide slots which are formed in said radially diverging spider arms of one of said turntable spiders, and the Geneva drive mechanism also embodies means for actuating said shot pin.

10. In a cyclicly-operable mold-forming machine, the combination set forth in claim 9 and wherein the Geneva actuator of the drive mechanism underlies the plane of the lower turntable spider, and the guide slots are formed in the radially extending arms of said lower turntable spider.

11. In a cyclicly-operable mold-forming machine, the combination set forth in claim 10 and wherein each spider arm of the lower turntable spider includes a pair of parallel side bars having anti-friction liners on their opposed sides, *and* the liners establish the guide slots in such spider arms.

12. In a cyclicly-operable mold-forming machine, the ombination set forth in claim 10 and including, addi-.onally, means at the distal end of each spider arm of ıe lower turntable spider establishing a turntable sta-ilizing socket, and an hydraulically-operable extensi-le and retractable shot pin movable mounted on the :amework and adapted, when extended, selectively to nter one of said stabilizing sockets.

13. In a cyclicly-operable mold-forming machine for imultaneously producing cope and drag mold parts nd thereafter assembling them to produce a composite ıold, in combination, a framework establishing a /orking station where the mold parts are produced and stripping station where the said mold parts are assem-ıled, a match plate support located at said working tation, a pattern-carrying match plate associated with aid support, upper and lower squeeze plates posi-ioned above and below said support, an upper reaction ıaten and a lower lifting platen located at said strip-ıing station, a flask carrier having a pair of upper and ɔwer vertically spaced and relatively fixed flask sup-ıorts, cope and drag flask sections normally resting on aid flask supports respectively and positioned in paced apart relation, said carrier being movable be-ween a first position wherein said flask supports strad-lle the match plate support and a second position /herein said flask supports are interposed between said ıatens, means located at said working station and ıperative when the carrier is in its first position to stablish successive stages of relative movement be-ween the match plate, the flask sections, and the queeze plates including a first stage wherein the drag lask section and the lower squeeze plate move up-vardly so that said drag flask section, match plate and :ope flask section are lifted successively from their espective supports and are assembled upon one an-ıther to define cope and drag flask cavities into which nolding sand is blown *simultaneously*, a second stage /herein the lower squeeze plate alone moves upwardly ınd effectively compresses the sand in said cavities ıgainst the upper squeeze plate in order to produce :ope and drag mold parts, and a third stage wherein the ɔwer squeeze plate and said flask sections with the nold parts therein move downwardly to restore the :ope flask section, the match plate and the drag flask ection successively to their respective supports, [ and ] means located at said stripping station and ıperative when the carrier is in its second position to stablish successive stages of relative movement be-ween the flask sections and the platens including a first tage wherein the lifting platen moves upwardly so that he drag flask section with its contained drag mold part ınd the cope flask section with its contained cope mold ıart are lifted successively from their respective sup-ıorts and assembled upon each other in order thereby o assemble the composite mold and clamp the latter ıetween the lift and reaction platens, a second stage /herein the flask sections are moved upwardly to strip he same from the clamped mold, and a third stage /herein said lifting platen, flask sections and mold nove downwardly so as to restore the cope and drag lask sections in an empty condition to their respective upports and carry the mold downwardly while resting ın said lifting platen to a level below the drag flask ection for lateral ejection from the stripping station, *ınd means for successively moving the carrier between ts first and second positions.*

14. In a cyclicly-operable mold-forming machine, the combination set forth in claim 13 and wherein said lower lifting platen at the stripping station is in the form of a bottom board, and there is provided in the vicinity of said stripping station means for pushing said bottom board, together with the mold thereon laterally out of the stripping station.

15. In a cyclicly-operable mold-forming machine, the combination set forth in claim 14 and wherein the means at the stripping station for effecting relative movement of the flask sections and platens embodies a vertically shiftable platform on which the bottom board rests, and the means for pushing the bottom board laterally out of the stripping station comprises an hydraulically-operable cylinder and plunger assembly positioned adjacent to the stripping station and including a plunger engageable with said bottom board when the latter is in its terminal lowermost position.

16. In a cyclicly-operable mold-forming machine for simultaneously and successively producing cope and drag mold parts and thereafter assembling such parts to produce a composite mold, in combination, a framework including a pair of laterally spaced sides which are generally C-shaped in configuration and [ presents ] *embody* horizontal upper and lower legs and vertical connecting bight portions, the region existing forwardly of the bight portions and between said upper and lower legs of said [ side supports ] *sides* establishing a working station, a pair of laterally spaced vertical corner posts positioned forwardly of said [ side supports ] *sides*, an upper frame extending between said upper legs and the corner posts, and a lower frame extending between said lower legs and the corner posts, the region of said framework adjacent to and rearwardly of said corner posts establishing a stripping station, the regions on opposite sides of said framework and laterally outside the confines thereof establishing a pair of dwell stations, said stations being quadrilaterally arranged about a vertical axis substantially midway between said working and stripping stations, a turntable mounted for rotation about said vertical axis and including a central column, an upper spider and a lower spider, each spider including a series of four radially extending spider arms, adjacent arms extending at a right angle to each other and the arms of the upper spider extending parallel to and overlying the arms of the lower spider, a series of four cope flask sections normally supported in chordal fashion on said upper spider with their ends loosely resting on adjacent spider arms, a series of four drag flask sections similarly normally supported in chordal fashion on said lower spider and directly underlying the cope flask sections whereby the cope and drag flask sections are paired vertically, means for indexing said turntable successively through an angle of 90° whereby successive indexing operations of the turntable will cause the paired flask sections to travel in a circular path leading into and extending out of said stations, means operative immediately after each indexing operation for locking the turntable in a fixed position wherein each of said paired flask sections is effectively disposed at one of said stations, a match plate support fixedly disposed in said working station, a match plate normally resting on said support and adapted to be straddled by each pair of flask sections when the latter are disposed at the working station, means located at said working station and operative in between turntable-indexing operations, first, to lift the match plate and the two associated flask sections from their respective supports, then, to assemble said flask sections in order to define upper and lower flask cavities on opposite sides of the match plate, then, simultaneously to [ introduce ] *blow* molding sand into such cavities, [ and ] *then to* compress the [ same ] *sand* in said cavities in order to produce cope and drag mold parts, and finally, to restore the match plate and said associated flask sections with the mold parts therein to their normal positions on their respective supports, and means *located* at said stripping station and operative in between turntable-indexing operations, first, to lift the associated flask sections [ from ] *with* the mold parts therein from their respective supports, then, to assemble said flask sections upon each other in order to establish a composite mold, then, to force the composite mold from the assembled associated flask sections, and finally to restore the empty flask sections to their normal positions on their respective supports.

17. In a cyclicly-operable mold-forming machine, the combination set forth in claim [ 19 ] *16* and wherein each flask support is provided with upstanding leader pins which project into pilot holes which are associated with the [ corresponding ] *associated* flask [ sections ] *section* [ for establishing ] whereby precise circumferential and radial positioning of the flask sections on their respective turntable spider arms *is established.*

18. In a cyclicly-operable mold-forming machine, the combination set forth in claim 1 and wherein the cope and drag sections have associated respectively therewith cope and drag upsets which are in turn respectively associated with and movable relatively to the upper and lower squeeze plates.

* * * * *